United States Patent
Ha et al.

(10) Patent No.: US 10,079,395 B2
(45) Date of Patent: Sep. 18, 2018

(54) METHOD AND APPARATUS FOR SIMULTANEOUS CONTROLLING OF FUEL CONCENTRATION AND TEMPERATURE OF LIQUID FUEL BY SENSOR-LESS AND TEMPERATURE-CONTROL BASED FEED-BACK CONTROL, LIQUID FUEL CELL APPARATUS USING THE SAME

(71) Applicant: KOREA INSTITUTE OF SCIENCE AND TECHNOLOGY, Seoul (KR)

(72) Inventors: Heung Yong Ha, Seoul (KR); Myunggi An, Siheung-si (KR); Woon Jo Kim, Eumseong-gun (KR)

(73) Assignee: KOREA INSTITUTE OF SCIENCE AND TECHNOLOGY, Seoul (KR)

( * ) Notice: Subject to any disclaimer, the term of this patent is extended or adjusted under 35 U.S.C. 154(b) by 1325 days.

(21) Appl. No.: 14/093,614

(22) Filed: Dec. 2, 2013

(65) Prior Publication Data
US 2014/0154599 A1   Jun. 5, 2014

(30) Foreign Application Priority Data

Nov. 30, 2012  (KR) .................. 10-2012-0138495
Nov. 28, 2013  (KR) .................. 10-2013-0146674

(51) Int. Cl.
  *H01M 8/04*      (2016.01)
  *H01M 8/04186*   (2016.01)
  (Continued)

(52) U.S. Cl.
  CPC ..... *H01M 8/04186* (2013.01); *H01M 8/0432* (2013.01); *H01M 8/04753* (2013.01); *H01M 8/04798* (2013.01); *H01M 8/1009* (2013.01)

(58) Field of Classification Search
  CPC ........... H01M 8/04186; H01M 8/0432; H01M 8/04753; H01M 8/04798; H01M 8/1009
  (Continued)

(56) References Cited

U.S. PATENT DOCUMENTS 7,816,045 B2   10/2010   Oishi et al.
7,910,256 B2    3/2011   Chen et al.
(Continued)

FOREIGN PATENT DOCUMENTS

JP    2006318715 A    11/2006
KR   10-2007-0039359   4/2007
(Continued)

OTHER PUBLICATIONS

Kuang-Yow Lian et al., "Sensor-less adaptive fuel concentration control for direct methanol fuel cells under varying load", Journal of Power Sources, 231 (2013), pp. 239-245.
(Continued)

*Primary Examiner* — Jonathan G Jelsma
*Assistant Examiner* — Rashid A Alam
(74) *Attorney, Agent, or Firm* — Goldilocks Zone IP Law

(57) ABSTRACT

A concentration of a fuel supplied to a fuel cell and a heat exchange rate of a heat exchanger are controlled simultaneously in order to maintain a temperature of fuel cell stack and a diluted fuel concentration that is supplied to the fuel cell stack in a target level. Further, by appropriately responding to an exterior temperature changes or unexpected fuel cell performance changes, it is possible to improve a system efficiency and stability of fuel cell operation and to regulate the fuel concentration quickly and accurately compared to a prior sensor-less concentration controller.

19 Claims, 17 Drawing Sheets

(51) Int. Cl.
*H01M 8/1009* (2016.01)
*H01M 8/0432* (2016.01)
*H01M 8/04746* (2016.01)
*H01M 8/04791* (2016.01)

(58) Field of Classification Search
USPC .......................................................... 429/429
See application file for complete search history.

(56) References Cited

U.S. PATENT DOCUMENTS

| | | | | |
|---|---|---|---|---|
| 2006/0188765 | A1* | 8/2006 | Matsuzaki | H01M 8/04559 429/431 |
| 2006/0286421 | A1* | 12/2006 | Shen | H01M 8/04007 429/443 |
| 2007/0082244 | A1* | 4/2007 | Kuriiwa | H01M 8/04194 429/431 |
| 2007/0259227 | A1* | 11/2007 | Oishi | H01M 8/04007 429/442 |
| 2007/0264544 | A1* | 11/2007 | Jang | H01M 8/04007 429/414 |
| 2007/0264548 | A1* | 11/2007 | Yagi | H01M 8/04194 429/415 |
| 2009/0110968 | A1 | 4/2009 | Ulrike et al. | |
| 2010/0167098 | A1* | 7/2010 | Furukawa | H01M 8/04955 429/442 |
| 2012/0292990 | A1* | 11/2012 | Watanabe | H01M 8/0491 307/10.1 |
| 2013/0196243 | A1* | 8/2013 | Braithwaite | H01M 8/04067 429/440 |
| 2014/0120446 | A1* | 5/2014 | Zhang | H01M 8/04761 429/444 |

FOREIGN PATENT DOCUMENTS

KR 10-2007-0109781 11/2007
KR 10-2009-0022521 3/2009

OTHER PUBLICATIONS

C.L. Chang et al., "Fuel sensor-less control of a liquid feed fuel cell under dynamic loading conditions for portable power sources (II)", Journal of Power Sources, 195 (2010), pp. 1427-1434.

C.L. Chang et al., "Fuel sensor-less control of a liquid feed fuel cell under dynamic loading conditions for portable power sources (I)", Journal of Power Sources, 182 (2008), pp. 133-140.

C.L. Chang et al., "Fuel sensor-less control of a liquid feed fuel cell system under steady load for portable applications", Journal of Power Sources, 164 (2007), pp. 606-613.

C.Y. Chen et al., "Portable DMFC system with methanol sensor-less control", Journal of Power Sources, 167 (2007), pp. 442-449.

C.Y. Chen et al., "Operation Characteristic Analysis of a Direct Methanol Fuel Cell System Using the Methanol Sensor-less Control Method", Fuel Cells, vol. 12, Issue 5 (2012), pp. 883-891.

* cited by examiner

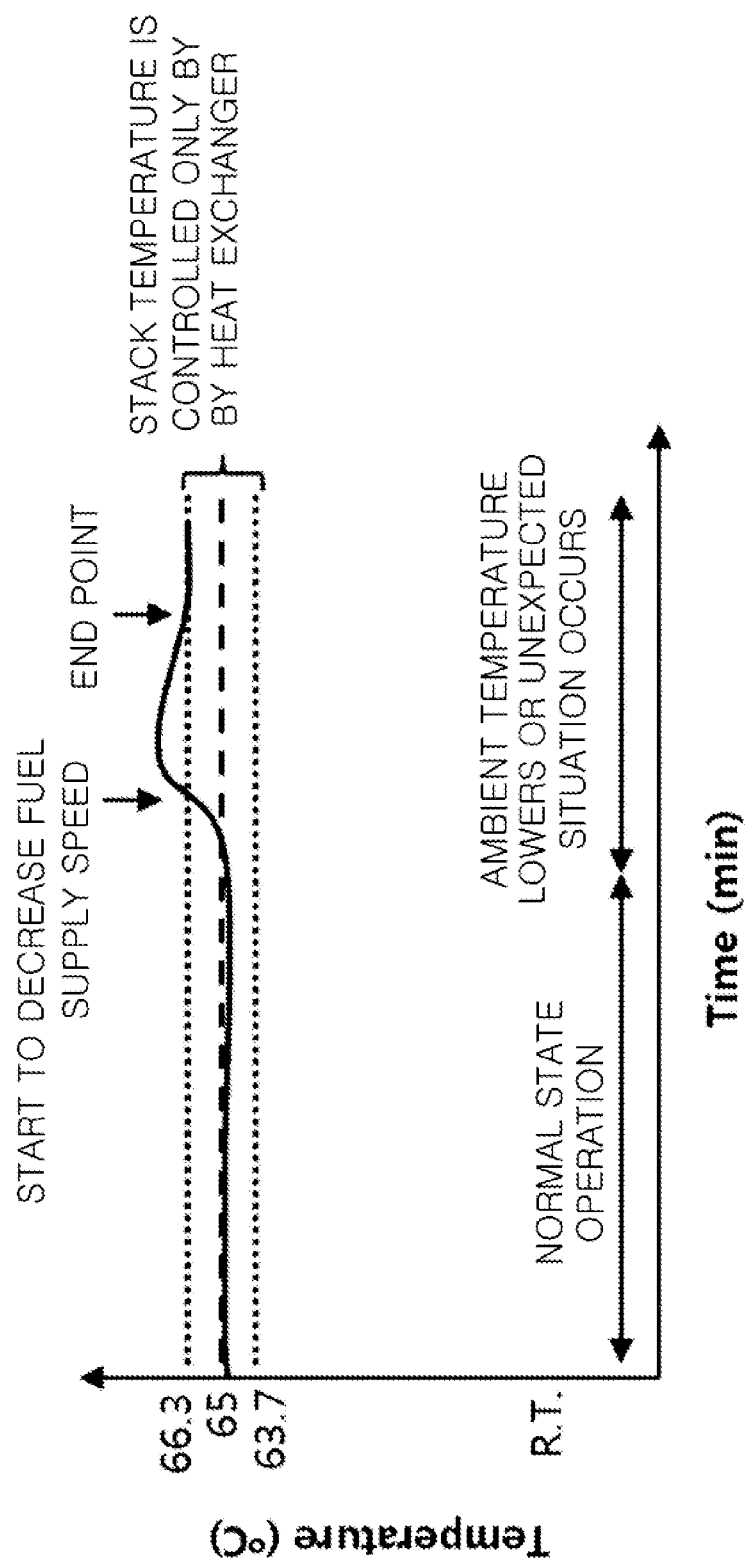

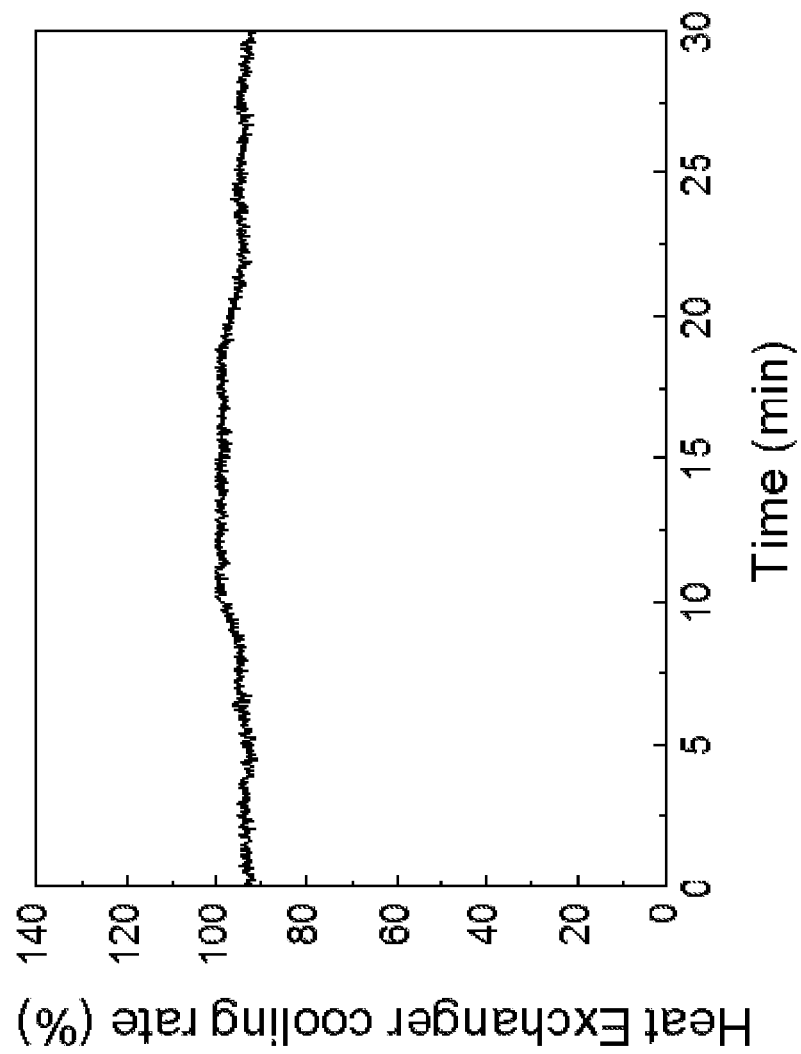

METHOD AND APPARATUS FOR SIMULTANEOUS CONTROLLING OF FUEL CONCENTRATION AND TEMPERATURE OF LIQUID FUEL BY SENSOR-LESS AND TEMPERATURE-CONTROL BASED FEED-BACK CONTROL, LIQUID FUEL CELL APPARATUS USING THE SAME

CROSS-REFERENCE TO RELATED APPLICATION

This application claims priorities to Korean Patent Application No. 10-2012-0138495 filed on Nov. 30, 2012 and Korean Patent Application No. 10-2013-0146674 filed on Nov. 28, 2013, and all the benefits accruing therefrom under 35 U.S.C. § 119, the contents of which in their entirety are herein incorporated by reference.

BACKGROUND

1. Field

The present disclosure relates to a control system and method for simultaneously controlling a fuel concentration supplied to a liquid fuel cell and a temperature of the liquid fuel cell by using a temperature-control based feed-back control without using a concentration sensor, and a fuel cell apparatus using the same.

2. Description of the Related Art

A fuel cell is a power generation system for generating electricity by electrochemically reacting oxygen and fuel, different from existing secondary batteries which store energy.

The fuel cell may be classified into various kinds such as a phosphate-type fuel cell, a solid oxide fuel cell, a polymer electrolyte membrane fuel cell, a molten carbonate fuel cell, an alkali fuel cell or the like, depending on the used electrolyte, and they show differences according to the kinds in their operating temperatures, output scales and applications.

Among them, the polymer electrolyte membrane fuel cell (PEMFC) includes a liquid fuel cell which uses a liquid fuel instead of hydrogen as a fuel.

The liquid fuel cell uses any one of methanol, ethanol, formic acid, isopropanol, propanol, ethylene glycol, dimethyl ether, butanol, water and their mixtures, and electrochemically reacts the mixed fuel with oxygen to directly convert the chemical energy of reactants into electric energy. The liquid fuel cell may be suitable as a future small mobile power source due to high fuel energy density and short charging time.

Chemical Formulas 1 to 3 below show an anode chemical formula, a cathode chemical formula and an entire chemical formula of a direct methanol fuel cell using methanol as a fuel, among the above liquid fuel cells.

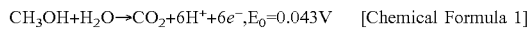  [Chemical Formula 1]

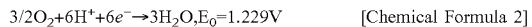  [Chemical Formula 2]

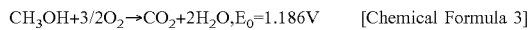  [Chemical Formula 3]

As in the above chemical formulas, in case of the direct methanol fuel cell, methanol oxidation reaction and oxygen reduction reaction occurs respectively at both electrodes with the electrolyte being interposed therebetween, hydrogen ions generated as a result of the reaction move from the anode to the cathode through the electrolyte membrane, and electrons move to the cathode through an external electric circuit.

In the liquid fuel cell such as the direct methanol fuel cell, it may give a great influence on the performance and energy efficiency of the fuel cell to supply an optimized fuel concentration to the fuel cell and reuse unreacted fuel discharged from a fuel cell stack.

In other words, when a liquid fuel used in the liquid fuel cell is supplied with a high concentration, a crossover phenomenon may occur so that the liquid fuel moves from the anode to the cathode through the electrolyte membrane, and to this end the fuel crossover may cause various problems such as a performance deterioration of the fuel cell, a decrease in energy efficiency of the fuel, etc.

The crossover phenomenon may be proportional to the fuel concentration. If the fuel concentration is higher than an optimal fuel concentration of the fuel cell, the amount of fuel crossover from the anode to the cathode through the electrolyte membrane may increase, which in turn may lower the performance. To the contrary, if a fuel with a low concentration is supplied to the anode of the fuel cell stack, a fuel deficiency may occur at the anode, which may decrease performance of the fuel cell.

Meanwhile, if a fuel is stored or used in a diluted state inside the liquid fuel cell apparatus, or if a fuel which has been used once and is still containing an unreacted fuel is discharged out and wasted, the energy efficiency of the fuel cell apparatus deteriorates and the advantage as a portable high-density power source may be lost.

Therefore, in order to supply a fuel with a low concentration and increase the energy density of the fuel cell apparatus, the fuel should be recirculated. In addition, in order to maintain the concentration of a recirculated fuel constantly, an undiluted fuel with a high concentration should be supplemented.

For reference, if a reacting solution containing a fuel, namely a diluted fuel, is supplied to the fuel cell stack, the fuel is consumed due to the reaction at the fuel cell stack, and a fuel solution containing an unreacted fuel may be discharged out of the stack. Here, the fuel concentration of the discharged fuel solution lowers below a target concentration. Therefore, in order to maintain the concentration of the fuel in the unreacted fuel solution discharged from the stack in a desired level, namely at a target concentration, an undiluted fuel with a high concentration should be added to the unreacted fuel discharged from the stack to control the concentration. In other words, the undiluted fuel should be supplemented to maintain the concentration of the diluted fuel constantly. For this, in a fuel cell system, a fuel mixer of a certain volume is installed in the fuel circulation system, and an unreacted fuel solution discharged from the fuel cell stack is introduced into the fuel mixer. In addition, an undiluted fuel with a high concentration is injected into the fuel mixer and mixed with the recirculated unreacted solution to make a diluted fuel optimized to have a target concentration, and the concentration-optimized diluted fuel is supplied to the fuel cell stack again.

In this regard, as representative fuel concentration control methods available in the art, there is a control method using a concentration sensor (for example, a methanol concentration sensor). In this control method, the concentration sensor is used to measure a fuel concentration in the fuel cell recirculation system, and while observing the change of concentration, an amount of undiluted fuel required for maintaining the fuel concentration constantly is calculated and supplied to the fuel cell, thereby controlling a concentration of the fuel supplied to the stack.

FIG. 1 is a schematic view showing a general fuel cell apparatus including a concentration sensor.

As shown in FIG. 1, the fuel cell system using a concentration sensor supplies a diluted aqueous fuel from a fuel mixer 1 through a fuel circulating pump 2 to the anode of a fuel cell stack 3.

In addition, regarding the fuel cell stack 3, air is supplied from an air blower 4 to the cathode of the fuel cell stack. The fuel mixer 1 is supplied with an undiluted fuel from an undiluted fuel container 5 through an undiluted fuel supply pump 6.

The undiluted fuel supply pump 6 is connected to a concentration controller 9, and the undiluted fuel supply pump 6 operates according to a signal generated by the concentration controller 9 of the undiluted fuel supply pump. In addition, the fuel mixer 1 is connected to a fuel concentration sensor 17, and the diluted fuel in the fuel mixer 1 is supplied to the concentration sensor 17 by a sensor pump 16 which supplies the fuel to the concentration sensor, thereby measuring a concentration of the diluted fuel.

However, in the conventional concentration control methods, a concentration sensor capable of measuring a concentration of a fuel supplied to the fuel cell should be attached, and separate pipes and a pump for transferring work pieces are required in the fuel circulation system so that the concentration sensor may measure a concentration of the fuel.

For this reason, the conventional concentration control method makes the fuel cell system more complicated and bigger, and the parasitic power losses due to the corresponding sensor and the pump increases, which deteriorate the energy efficiency of the fuel cell system. Further, concentration sensors presently available in the art are expensive and have great measurement errors and short life spans. Therefore, if the concentration sensors are applied to the fuel cell system, the fuel cell system has an increased production cost and lower safety, and therefore may not maintain price and quality competitiveness as a portable power source.

In order to solve the above problems, concentration sensors using electrochemical reactions have been studied and developed.

For example, the concentration sensor using an electrochemical reaction may be fabricated with a lower cost in comparison to an existing concentration sensor. However, as time goes on, the reproducibility and stability of measurement is lowered since the catalyst in the sensor loses its activity.

To solve this problem, a concentration control method without using a concentration sensor is being developed. For example, a method of constantly maintaining a concentration of a diluted fuel injected to a fuel cell by additionally supplying an undiluted fuel as much as the consumed amount of fuel has been developed.

However, according to an observation by the inventors of the present disclosure, this method takes much time to increase a concentration to a target concentration since it does not use a feed-back function and a concentration control method for a startup of a liquid fuel cell in combination. In addition, the rate of change of diluted fuel concentration is slow, and the ability to react to a change of outside environments is not provided.

As an alternative, a method of controlling a concentration of a liquid fuel by injecting a specific amount of liquid fuel during a predetermined period and measuring changes of output power, output voltage or temperature of fuel cell stack, and comparing the changes with already-observed values has been developed.

However, according to an observation by the inventors of the present disclosure, this method has a slow response due to a delay time for periodic observing, does not ensure accurate concentration control, and has an increased error in concentration control if the performance of the fuel cell deteriorates over time due to a long-term operation. In addition, these methods are just applicable to steady-state conditions, where an output current and a temperature of the fuel cell stack reaches to a target value and remains constant.

Meanwhile, methods of controlling a concentration of a fuel by dynamically changing an output current of fuel cell are also being developed.

For example, a method of predicting a concentration of a liquid fuel by intentionally changing the value of the output current density of fuel cell and observing the resultant voltage changing pattern of fuel cell has been proposed.

However, according to an observation by the inventors of the present disclosure, this method also takes relatively long time for controlling a concentration and operating a fuel cell in a normal state, and a temperature and a voltage of the fuel cell stack and a concentration of the fuel continuously vary. In addition, when the performance of the fuel cell deteriorates over time, the concentration control error increases.

Further, while the above methods control a fuel concentration in a normal state operation of a liquid fuel cell without using a sensor, a method of controlling a fuel concentration in a startup of a liquid fuel cell or controlling an output current density is not being developed.

In case of a liquid fuel cell system, in a stratup period of an operation, a fuel concentration is controlled within a great variation range on occasions, and a startup time which is required so that an operating condition of fuel cell reaches a preset target value and a normal state is long.

To solve these drawbacks, a method of determining a fuel feed amount with reference to information of a concentration sensor in a startup stage and an ambient temperature, and controlling the determined fuel feed amount to increase the stack temperature to a target temperature has been developed.

If the ambient temperature is low, the pumping rate of the undiluted fuel is set to be high, and if the ambient temperature is high, the pumping rate of the undiluted fuel is set to be low. The set feed speed of the undiluted fuel is controlled so that the temperature of the stack rises over the set target temperature.

However, according to an observation by the inventors of the present disclosure, this method controls only a fuel concentration in the startup period, and a method for controlling an output current density in the period is not proposed. In addition, since a concentration sensor is used, this method is fundamentally different from a concentration control method not using a sensor, and the variation of ambient temperature which may occur in operation is not considered.

If the ambient temperature increases in operation, a water shortage phenomenon in which water in the water tank is exhausted may occur. If the ambient temperature decreases on the contrary, the heat loss of the stack may increase, which reduces the efficiency of the fuel and the system.

SUMMARY

The present disclosure is directed to providing a method for simultaneously controlling a fuel concentration and a temperature of liquid fuel cell by using a temperature-control based feed-back control without using a concentration sensor, comprising:

obtaining a database by measuring fuel consumption rates or speed according to operating conditions of a liquid fuel cell, and preparing a fuel consumption equation according to operating conditions based on the database (S1);

determining a fuel consumption rate or speed in a given operating condition based on the fuel consumption equation determined in Step S1, and determining an undiluted fuel feed amount or speed corresponding to the determined fuel consumption rate or speed (S2);

setting a target temperature ($T_f$) and selecting either a target-condition control mode or a present-condition control mode, and supplying an undiluted fuel to a fuel mixer in an undiluted fuel feed amount or speed determined according to the selected mode, and then supplying thus madediluted fuel in the fuel mixer to a stack of the fuel cell to start an operation of the fuel cell (S3);

fixing the target-condition control mode so that the undiluted fuel is supplied accordingly if the temperature of the stack reaches a predetermined intermediate temperature ($T_i$) that is lower than the target temperature ($T_f$), and performing a feed-back control to a heat removal rate of the heat exchanger comparing the present temperature of the fuel cell stack with the target temperature so that the temperature of the fuel cell stack is maintained in a normal state where the temperature of the fuel cell stack is within a preset error bound from the target temperature ($T_f$) (S4); and increasing or decreasing the undiluted fuel flux or flow rate fixed before according to the target-condition control mode in S4, if the fuel cell is in an abnormal state where the temperature (T) of the fuel cell stack deviates from the preset error bound from the target temperature ($T_f$) although the heat exchanger operates in a maximum manner or in a minimum manner, by feed-back control comparing the present temperature of the fuel cell stack with the target temperature so that the temperature of the fuel cell stack comes back to a normal state where the temperature (T) of the fuel cell stack is within a preset error bound from the target temperature ($T_f$).

In an exemplary embodiment, in the step S1, the fuel consumption rate or speed of Step S1 is determined as the sum of a fuel consumption rate or speed required for generating a current at the fuel cell and an inevitable fuel loss rate or speed when the fuel cell is in operation.

In an exemplary embodiment, the fuel consumption rate or speed required for generating a current is determined by a measured current value according to the operation of the fuel cell and a Faraday constant.

In an exemplary embodiment, the inevitable fuel loss rate is determined as the sum of fuel losses caused by crossover of a fuel passing from the anode of the fuel cell to the cathode and a fuel loss caused by evaporation at a gas-liquid separator and/or a fuel mixer.

In an exemplary embodiment, in the step S3, if temperature (T) of the fuel cell stack is lower than the intermediate temperature ($T_i$), an output power of the heat exchanger is set to be 0 (zero), and in the step S4, if temperature (T) of the fuel cell stack is equal to or higher than the intermediate temperature ($T_i$), the heat exchanger starts to perform heat exchange.

In an exemplary embodiment, in the step S4, the intermediate temperature ($T_i$) is lower than the target temperature ($T_f$), by 5 to 30° C.

In an exemplary embodiment, when the fuel cell is being operated, the method further comprises determining whether to stop an operation of the fuel cell based on an output voltage of the fuel cell stack and a temperature of the fuel cell stack, and the operation of fuel cell is stopped if the output voltage is lower than a minimum output voltage ($V_{min}$) or the temperature of the fuel cell stack exceeds an upper limit.

In an exemplary embodiment, the minimum output voltage ($V_{min}$) is 0.1~0.2V, and the upper limit of temperature is 80 to 100° C.

In an exemplary embodiment, in the step S3 and S4, the feed-back control manner is respectively one or combination of P, PI or PID, where P stands for proportional, I for integral, and D for derivative.

In an exemplary embodiment, in a startup stage, controlling an output current is further performed, and in a region where the output current density (I) is lower than the final output current density ($I_{st}$), the output current density is increased by each increment ($\Delta I$) of 5 to 100 mA/cm$^2$, if an elapsed time (t) reaches a holding time ($t_h$), and in each increasing stage, if the voltage change rate (dV/dt) reaches the first voltage change rate (P1) while the current is constantly maintained, then the output current density is not increased until the corresponding voltage change rate (dV/dt) reaches the second voltage change rate (dV/dt) (P2), and after reaching the second voltage change rate (dV/dt) (P2), the output current density is increased by the increment ($\Delta I$) even before the elapsed time (t) reaches the holding time ($t_h$), and the above process is repeated to reach the final target output current.

The present disclosure is also directed to providing an apparatus for simultaneously controlling a fuel concentration and a temperature of liquid fuel cell by using a temperature-control based feed-back control without using a concentration sensor, comprising a microprocessor, the microprocessor being programmed to perform:

determining a fuel consumption rate or consumption speed in a given operation condition based on a database of a fuel consumption rate or consumption speed of the liquid fuel cell, which database is determined according to operating conditions, and determining undiluted fuel fluxes or flow rates corresponding to the fuel consumption rates or consumption speeds;

selecting any one of the target-condition control mode and the present-condition control mode and starts an operation of fuel cell by supplying an undiluted fuel at a flux or flow rate determined accordingly;

fixing the target-condition control mode so that the undiluted fuel is supplied accordingly if the temperature of the fuel cell stack reaches a predetermined intermediate temperature ($T_i$) lower than the target temperature ($T_f$), and performing a feed-back control to a heat removal rate of the heat exchanger comparing the present temperature of the fuel cell stack with the target temperature so that the temperature of the fuel cell stack is maintained in a normal state where the temperature of the fuel cell stack is within a preset error bound from the target temperature ($T_f$); and increasing or decreasing the undiluted fuel flux or flow rate fixed according to the target-condition control mode, if the temperature of the fuel cell stack deviates from the preset error bound from the target temperature, by feed-back control comparing the present temperature of the fuel cell stack with the target temperature so that the temperature of the fuel cell stack comes back to a normal state where the temperature of the fuel cell stack is within a preset error bound from the target temperature ($T_f$).

In an exemplary embodiment, the microprocessor comprises: a storage unit in which a database is built with fuel consumption rates or consumption speeds of the liquid fuel cell determined according to operating conditions; a first processing unit which is programmed for calling the database in relation to the fuel consumption speed from the first processing unit, calculating a fuel consumption rate or consumption speed based on the database, and sending a signal in relation to an undiluted fuel feed amount or feed speed to an undiluted fuel supply unit; and a second processing unit which is programmed for receiving a signal in relation to a present temperature from the temperature measuring device of the fuel cell stack, comparing the present temperature of the fuel cell stack with a target temperature to calculate an error value, calculating a control output quantity based on the error value by means of P, PI or PID manner, and sending the corresponding control output quantity (an electric signal) to the undiluted fuel supply unit and/or a heat exchange rate control unit of the heat exchanger.

In an exemplary embodiment, the second processing unit comprises: a 2-1 processing unit which is programmed for receiving a signal in relation to a present temperature from the temperature measuring device of the fuel cell stack, comparing the present temperature of the fuel cell stack with a target temperature to calculate an error value, calculating a control output quantity based on the error value by means of P, PI or PID manner, and sending the corresponding control output quantity (an electric signal) to the undiluted fuel supply unit; and a 2-2 processing unit which is programmed for receiving a signal in relation to a present temperature from the temperature measuring device of the fuel cell stack, comparing the present temperature of the fuel cell stack with a target temperature to calculate an error value, calculating a control output quantity based on the error value by means of P, PI or PID manner, and sending the corresponding control output quantity to a heat exchange rate control unit of the heat exchanger.

In an exemplary embodiment, the microprocessor is programmed to further performing: determining whether to stop an operation of the fuel cell based on an output voltage of the fuel cell stack and a temperature of the fuel cell stack, and the operation of fuel cell is stopped if the output voltage is lower than a minimum output voltage ($V_{min}$) or the temperature of the fuel cell stack exceeds an upper limit.

In an exemplary embodiment, the microprocessor is programmed to further performing: controlling an output current in a startup stage, and wherein in a region where the output current density (I) is lower than the final output current density ($I_{st}$), the output current density is increased by each increment ($\Delta I$) of 5 to 100 mA/cm$^2$, if an elapsed time (t) reaches a holding time ($t_h$), and in each increasing stage, if the voltage change rate (dV/dt) reaches the first voltage change rate (P1) while the current is constantly maintained, then the output current density is not increased until the corresponding voltage change rate (dV/dt) reaches the second voltage change rate (dV/dt) (P2), and after reaching the second voltage change rate (dV/dt) (P2), the output current density is increased by the increment ($\Delta I$) even before the elapsed time (t) reaches the holding time ($t_h$), and the above process is repeated to reach the final target output current.

In an exemplary embodiment, the data storage unit is connected to devices measuring one or more selected from the group consisting of output voltage, output current, stack temperature and ambient pressure.

The present disclosure is directed to providing a liquid fuel cell apparatus, comprising: a fuel cell stack; a heat exchange unit connected to the fuel cell stack; a fuel supply unit supplying a diluted fuel to the fuel cell stack; a device for measuring the fuel cell stack temperature; and devices for measuring output voltage and output current of the fuel cell stack, and the said control device.

In an exemplary embodiment, the fuel supply unit comprises a fuel mixer supplying a diluted fuel to the fuel cell stack and a undiluted fuel cell supply pump supplying an undiluted fuel to the fuel mixer, and the control device is connected to the undiluted fuel pump, and the heat exchange unit comprises an anode side heat exchanger connected to an anode and a cathode side heat exchanger connected to a cathode, and blowing fans which are connected to the heat exchange units, and the control device is connected to the blowing fans.

In an exemplary embodiment, the liquid fuel employed by the liquid fuel cell is at least one of reactants of methanol, ethanol, formic acid, isopropanol, propanol, ethylene glycol, dimethyl ether, butanol, hydrogen, butane, ethane, propane, carbon dioxide, water, bio fuel, and their mixtures.

According to embodiments of the present disclosure, in an aspect, the fuel cell apparatus of the present disclosure is basically a sensor-less type not using a concentration sensor. Therefore, the fuel cell apparatus may have a simple and small design, which reduces the power consumed for operation and lowers the apparatus price.

According to embodiments of the present disclosure, in another aspect, a temperature-control based feed-back controller is used to control a fuel concentration and a heat exchanger so that a heat removal rate of the heat exchanger and a concentration of the diluted fuel are adjusted simultaneously. Therefore, even in a dynamic state in which the performance of the fuel cell varies due to the operating condition changes comprising of the changes in the exterior environment or the electric load, the temperature of the fuel cell stack and the concentration of the diluted fuel supplied to a stack may be constantly maintained in a desired level, and an error range for the concentration control may be controlled small.

According to embodiments of the present disclosure, in another aspect, in comparison to an existing sensor-less concentration control method, the fuel cell apparatus ensures a smaller error, a more stable operation, an excellent response characteristic, easy temperature control of the stack, and a long life span.

According to embodiments of the present disclosure, in another aspect, since a concentration of the fuel supplied to the stack and a temperature of a mixture solution circulating in the fuel circulation system are simultaneously controlled based on the amount of fuel consumed by the fuel cell system and the temperature of the stack, it is possible to maximize the efficiency of the fuel cell system while constantly maintaining the concentration of the fuel injected into the fuel cell and the temperature of the stack.

According to embodiments of the present disclosure, in another aspect, since a heat removal rate of the heat exchanger is controlled in a feed-back manner by comparing a present temperature of the stack with the target temperature, the temperature of the mixed solution circulating in the fuel circulation system may be controlled to minimize a heat loss of the stack, which may occur due to the change of the ambient temperature, and loss of water circulating in the fuel circulation system.

According to embodiments of the present disclosure, in another aspect, in a startup stage in which an output current of the fuel cell system is controlled, an output current may be increased stably and fast with reference to a voltage change rate of the stack.

BRIEF DESCRIPTION OF THE DRAWINGS

The above and other aspects, features and advantages of the disclosed exemplary embodiments will be more apparent from the following detailed description taken in conjunction with the accompanying drawings in which:

FIGS. 4b and 4c are graphs showing the variation of a temperature of the stack and a corresponding temperature control method, and the resultant variation of a temperature of the stack. FIG. 4b shows the case including a startup, and FIG. 4c shows the case not including the startup. In FIGS. 4b and 4c, X axis represents time (minute), and Y axis represents temperature (° C.).

In FIG. 5b, X axis represents time (second), and Y axis represents voltage (V). In FIG. 5c, X axis represents time (second), and Y axis represents a voltage change rate.

In FIG. 7, X axis represents a current density, and Y axis represents a fuel (methanol) consumption rate.

FIG. 8a shows the case of controlling with using P1, P2, and FIG. 8b shows the case of feed-back control using P1, P2 according to an algorithm of FIG. 5a.

Figure 1:
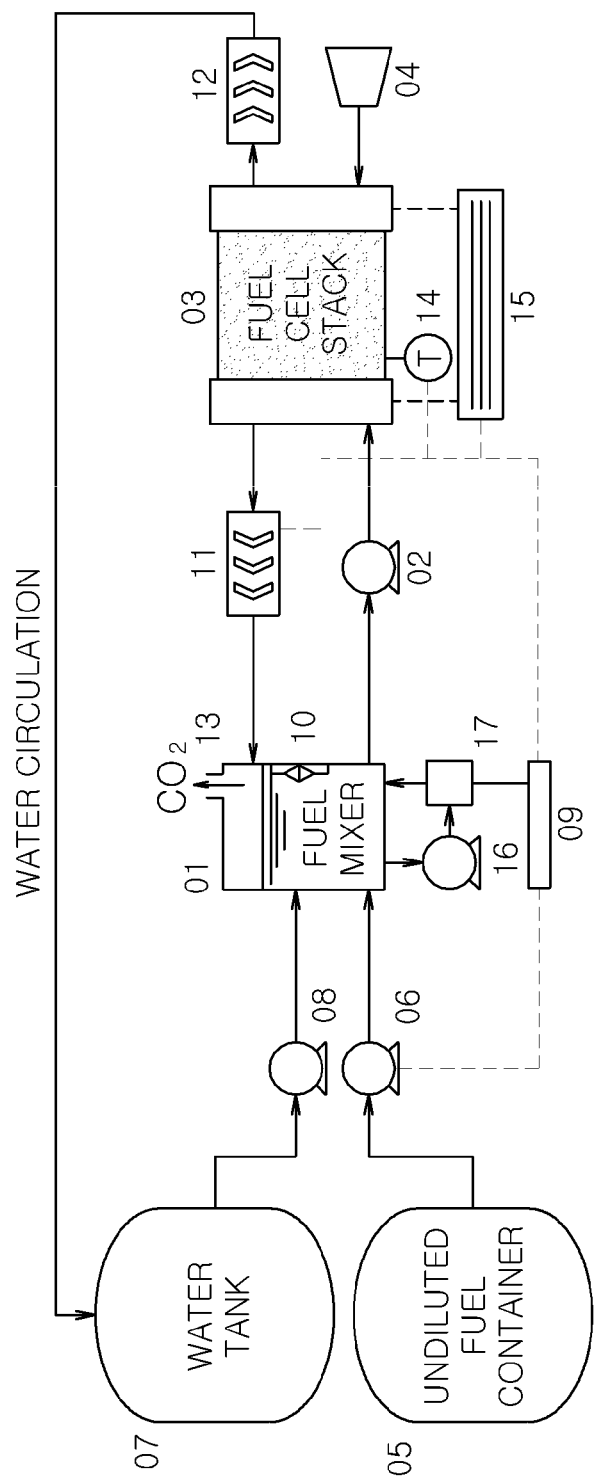
FIG. 1 is a schematic view showing a general fuel cell apparatus including a concentration sensor.
Figure 8A:
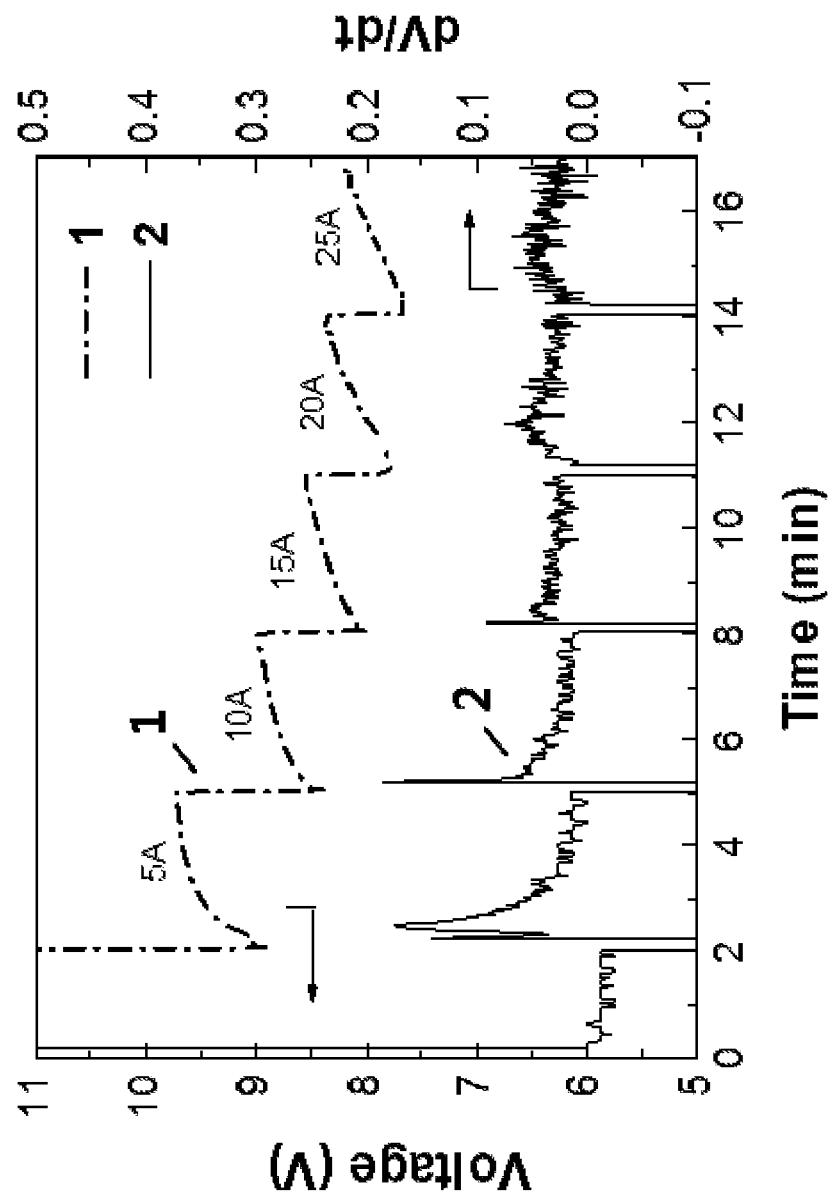
FIGS. 8a and 8b are graphs showing an example of controlling an output current density in a startup of the direct methanol fuel cell by means of a feed-back method in the embodiment of the present disclosure.
Figure 8B:
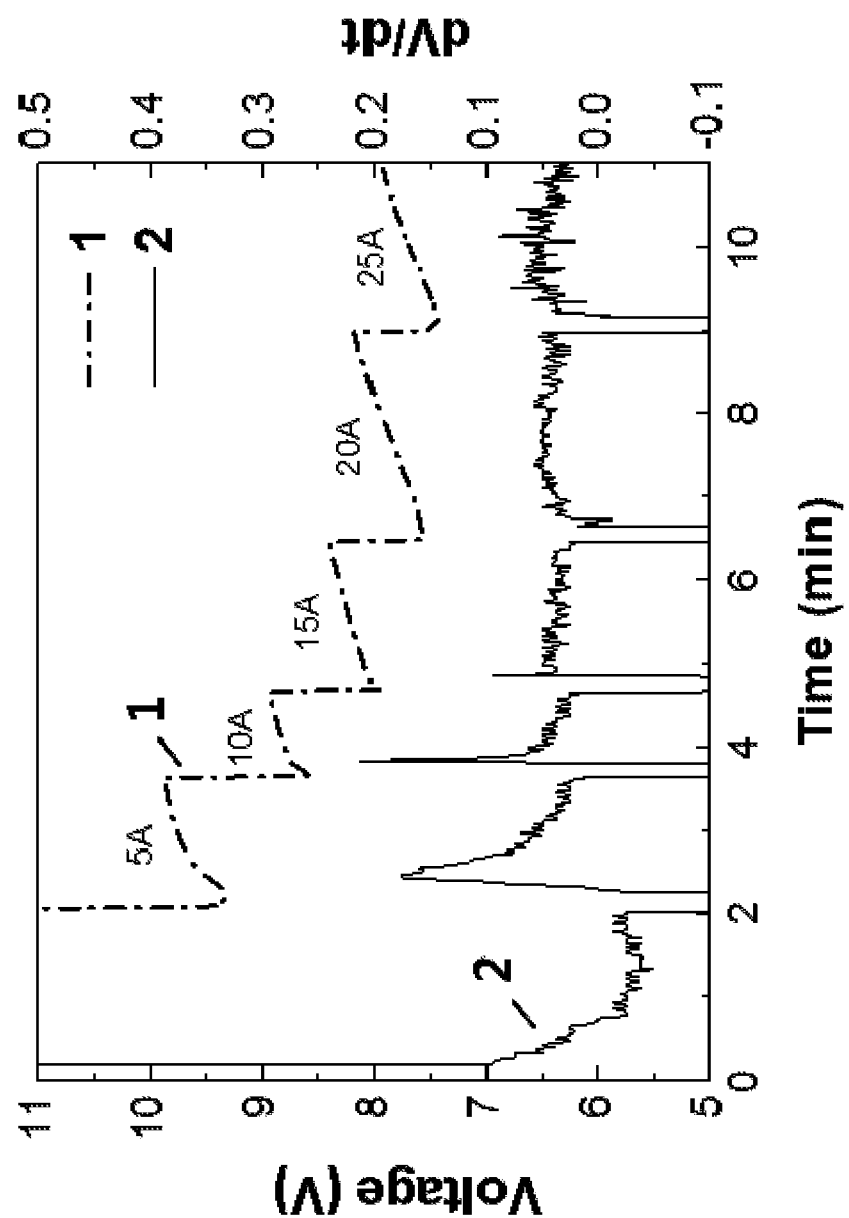

For reference, in FIGS. 8a and 8b, 1 denotes a voltage (V) and 2 denotes a voltage change rate (dV/dt).

Figure 9A:
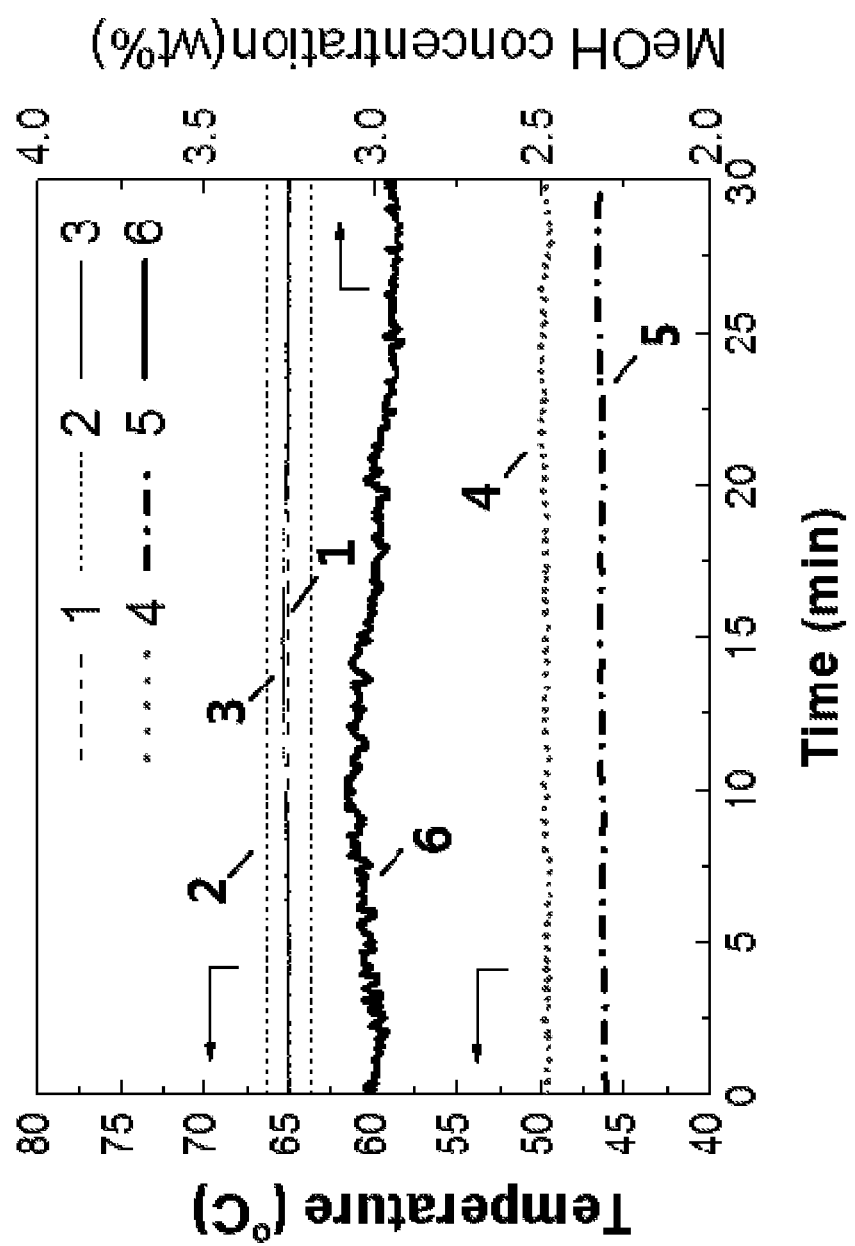

FIG. 9a is a graph showing a result that the temperature of a stack is constantly maintained as a target temperature by a feed-back controller of the heat exchanger, when an undiluted fuel is supplied to a fuel mixer in a target-condition control mode, in the steady-state operation of the liquid fuel cell according to the embodiment of the present disclosure.

For reference, in FIG. 9a, 1 denotes a target temperature of stack, 2 denotes an error bound range set from the target temperature, 3 denotes a temperature of stack, 4 denotes a temperature of outlet of heat exchanger, 5 denotes a temperature of anode of stack, 6 denotes a concentration of diluted fuel.

FIG. 9b is a graph showing the change in heat exchanger cooling rate corresponding to FIG. 9a.

Figure 10A:
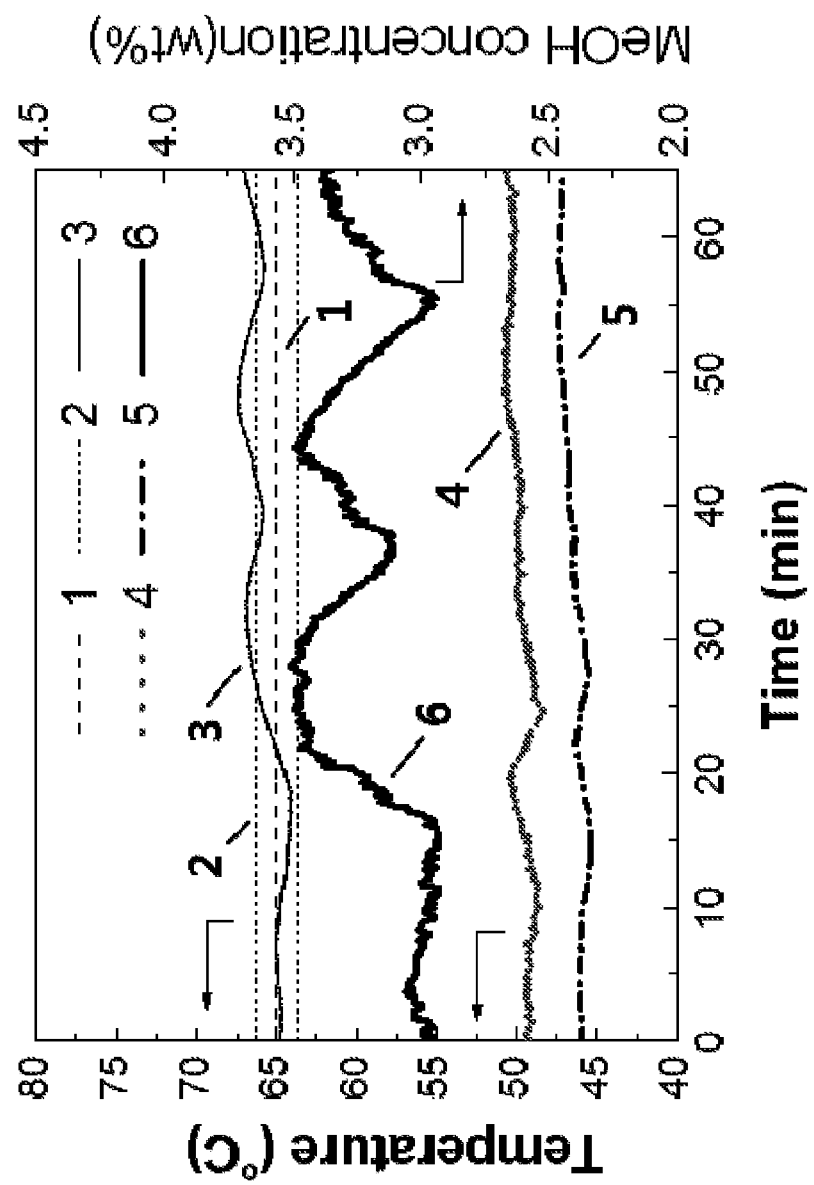
Figure 10B:
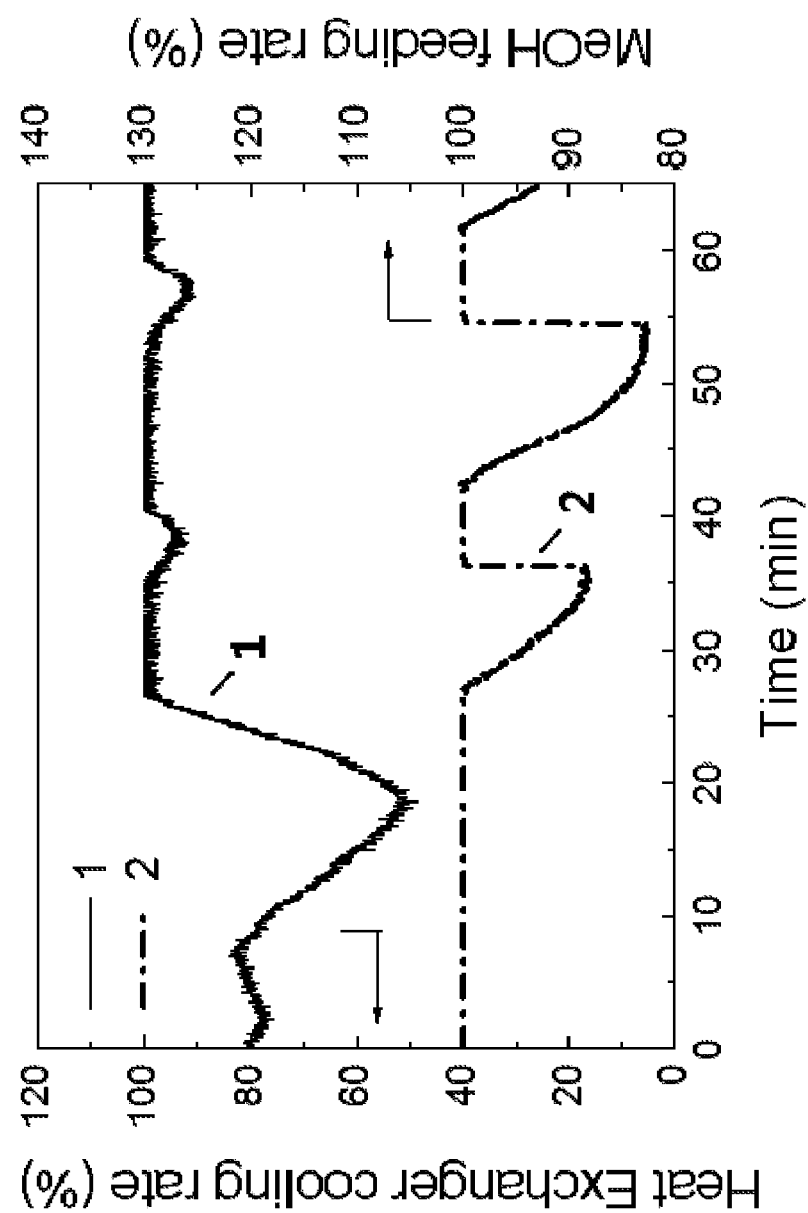

FIGS. 10a and 10b are graphs showing a result of controlling a concentration of the diluted fuel based on a final target temperature, when the temperature of the stack gradually departs away from the final target temperature, in the steady-state operation of the liquid fuel cell according to the embodiment of the present disclosure.

For reference, in FIG. 10a, 1 denotes a target temperature of stack, 2 denotes an error bound range set from the target temperature, 3 denotes a temperature of stack, 4 denotes a temperature of outlet of heat exchanger, 5 denotes a temperature of anode of stack, 6 denotes a concentration of diluted fuel. Further, in FIG. 10b, 1 denotes a heat removal rate of heat exchanger and 2 denotes a feed rate of raw methanol.

DETAILED DESCRIPTION OF MAIN ELEMENTS

1: fuel mixer
2: diluted fuel supply pump
3: fuel cell stack
4: air blowing fan
5: undiluted fuel container
6: undiluted fuel supply pump
7: water tank
8: water supply pump
9: concentration controller using a concentration sensor
10: liquid level meter
11: anode heat exchanger
12: cathode heat exchanger
13: carbon dioxide gas discharger
14: temperature measuring device
15: output voltage/current measurement device
16: sensor pump (for supplying a diluted fuel to a concentration sensor)
17: methanol concentration sensor
18: control device of a liquid fuel cell not using a concentration sensor

DETAILED DESCRIPTION

Example embodiments now will be described more fully hereinafter with reference to the accompanying drawings, in which example embodiments are shown. The present disclosure may, however, be embodied in many different forms and should not be construed as limited to the example embodiments set forth therein. Rather, these example embodiments are provided so that the present disclosure will be thorough and complete, and will fully convey the scope of the present disclosure to those skilled in the art. In the description, details of well-known features and techniques may be omitted to avoid unnecessarily obscuring the presented embodiments.

The terminology used herein is for the purpose of describing particular embodiments only and is not intended to be limiting of the invention. As used herein, the singular forms "a," "an" and "the" are intended to include the plural forms as well, unless the context clearly indicates otherwise. Furthermore, the use of the terms a, an, etc. do not denote a limitation of quantity, but rather denote the presence of at least one of the referenced item. The terms "first," "second," and the like do not imply any particular order, but are included to identify individual elements. Moreover, the use of the terms first, second, etc. do not denote any order or importance, but rather the terms first, second, etc. are used to distinguished one element from another.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein. All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein.

In the specification, the term 'fuel recirculation' means that an unreacted fuel discharged from a fuel cell stack is not emitted out but supplemented with an undiluted fuel with a high concentration by a fuel mixer to make a diluted fuel with a desired concentration (i.e., a reacting solution containing a fuel), and then the diluted fuel with the adjusted concentration is supplied again to the fuel cell stack.

In the specification, the term 'undiluted fuel' means a fuel with a high concentration, which is stored in a fuel storehouse. The undiluted fuel may include a crude liquid of 100% concentration, but is not limited thereto and thus the undiluted fuel may include a high concentration less than 100%, for example, 10 wt % or above, preferably 40 wt % or above.

In the specification, the term 'diluted fuel' means a fuel whose concentration is adjusted to a predetermined value at a fuel mixer and then supplied to a fuel cell stack, and the diluted fuel may have a much lower concentration in comparison to the undiluted fuel.

In the specification, the term 'target concentration' or 'target concentration value' means a given target concentration when a fuel concentration of a diluted fuel supplied to the stack is adjusted to a predetermined value.

In the specification, the term 'present-condition control mode' is one of methods for adjusting a concentration of a diluted fuel supplied to the fuel cell stack, and refers that a feed flux or flow rate of the undiluted fuel is determined by adopting a fuel consumption amount or rate determined by a fuel consumption equation according to an operation condition (output current of fuel cell, temperature of fuel cell stack, concentration of diluted fuel, flow rate of diluted fuel, etc.) at a present time where a fuel cell is being operated and a concentration control is being performed. For reference, as described later, in an exemplary embodiment, an intermediate temperature ($T_i$) is set, so that below the intermediate temperature, an undiluted fuel is supplied in a flux or flow rate, calculated by the fuel consumption equation to correspond to the present operation condition. Above the intermediate temperature, an undiluted fuel is supplied as much as a fuel consumption amount or speed consumed in a final fuel cell operation condition, namely the target condition.

In the specification, the term 'target-condition control mode' is one of methods of controlling a concentration of a diluted fuel supplied to the fuel cell stack, and refers that a flux or flow rate of the undiluted fuel is determined by adopting a fuel consumption amount or rate determined by the fuel consumption equation according to a predetermined final target operation condition, not according to an operation condition at a present time where a fuel cell is being operated and a concentration control is being performed. For reference, as described later, in an exemplary embodiment, when the undiluted fuel is supplemented to the fuel mixer from a startup of the fuel cell, the undiluted fuel is supplied in a flux or flow rate determined by the fuel consumption equation in the final target operation condition, regardless of the present temperature and output current of the fuel cell stack.

In the specification, the term 'operating condition' means an operating condition of a fuel cell, which may include, for example, at least one of a concentration of fuel supplied to a fuel cell stack, a flux or flow rate of a fuel supplied to a fuel cell stack, a temperature of a fuel cell stack, an output current and voltage of a fuel cell, etc.

In the specification, the term 'startup or startup stage' refers to an operation state where an operation state of a fuel cell stack does not yet reach a targeted output current or does not yet reach within a preset error bound from a target temperature of the fuel cell stack after the fuel cell stack starts to operate.

In the specification, the term 'normal state' refers to an operation state where an operation state of a fuel cell stack reaches a targeted output current and also reaches within a preset error bound from a target temperature of the fuel cell stack.

In the specification, the term 'abnormal state' refers to an operation state where a temperature of a fuel cell stack break a preset error bound from a target temperature of the fuel cell stack.

Hereinafter, embodiments of the present disclosure will be described in detail.

In embodiments of the present disclosure, a concentration of a fuel supplied to a fuel cell and a temperature of a mixed solution circulating in a fuel circulation system are controlled simultaneously in order to maintain a temperature of a stack of a fuel cell (hereinafter, referred to as 'fuel cell stack' or 'stack') in a target level.

In exemplary embodiments of the present disclosure, in order to control a concentration of a diluted fuel supplied to a stack, a feed amount (flux) or a feed speed (flow rate) of an undiluted fuel supplied to the fuel mixer is controlled (concentration control). In addition, in order to control a temperature of the stack, a heat exchange rate of a heat exchanger, for example a heat removal rate or a concentration of diluted fuel supplied to a fuel cell stack, is controlled (temperature control).

Regarding the concentration control, for example, a feed amount or feed speed of an undiluted fuel supply unit is determined according to a fuel consumption rate or amount calculated based on a present operation condition or target operating condition, and accordingly, a fuel cell startup is initiated while supplying the undiluted fuel to the fuel mixer, so that the temperature of the fuel cell stack reaches a predetermined intermediate temperature ($T_i$).

If the temperature of the fuel cell stack reaches the intermediate temperature ($T_i$), the feed amount or feed speed of the undiluted fuel is fixed in a target-operation control mode, and from this point, the fuel cell stack operates under a target operating condition or a steady-state condition. In the normal state, the feed amount of the undiluted fuel supplied to the fuel mixer is identical to the fuel consumption rate calculated based on the target operating condition, and by this concentration control, the concentration of the diluted fuel supplied to the stack may be constantly maintained within an error range (bound) of the target concentration.

Meanwhile, if an ambient temperature abruptly changes or a fuel concentration is not accurately controlled, the temperature of the stack may gradually depart from the target temperature and deviate from a preset error range (%).

If the temperature of the fuel cell stack deviates from the preset target temperature error range (%), the feed-back control is performed to the heat exchanger, and simultaneously the preset feed amount or feed speed of the undiluted fuel is increased or decreased by means of feed-back control, thereby initiating to control a concentration of the diluted fuel injected into the fuel cell stack.

In other words, if the temperature of the fuel cell stack rises over the error range, the feed amount or feed speed of the undiluted fuel is decreased, and if the temperature of the fuel cell stack lowers below the error range, the feed amount or feed speed of the undiluted fuel is increased.

If the temperature of the fuel cell stack deviating from the error range changes into the preset error range and is normally controlled, the feed amount or feed speed of the undiluted fuel supplied to the fuel mixer is fixed again as the target operating condition value, and the feed-back control for the feed amount or feed speed of the undiluted fuel is stopped.

For reference, a conventional technique manually supplies an amount of fuel determined by the fuel consumption equation to a stack. However, in embodiments of the present disclosure, when determining the feed amount or feed speed of the undiluted fuel, the concentration of the diluted fuel is actively controlled based on the temperature of the stack by means of the feed-back manner, and thus the fuel concentration may be controlled quickly and accurately without using a concentration sensor.

Meanwhile, in order to control the temperature, for example, a heat exchange rate of a heat exchanger connected to the fuel cell stack (for example, a heat removal rate of a heat exchanger connected to an anode outlet of the fuel cell stack) is controlled by means of the feed-back control to adjust a temperature of a mixed solution flowing in the fuel circulation system, thereby controlling the temperature of the stack. This control method is clearly different from a method based on concentration control, since the temperature of the stack is controlled to be maintained as a target temperature by using a heat exchanger regardless of the fuel concentration control.

The above control method based on temperature control has a greatest advantage in that the heat loss of the fuel cell stack, which may occur due to the change of an ambient temperature, and the loss of water circulating in the fuel circulation system may be minimized.

In other words, if the ambient temperature increases and thus the temperature of the fuel cell stack increases, the temperature of the diluted fuel circulating in the fuel circulation system may increase, and thus the amount of water evaporating from the fuel mixer and the water tank may increase and the loss of water due to a crossover from anode to cathode in stack may increase as well. In this case, the concentration of the diluted fuel supplied to the stack increases and thus the stack temperature increases, which may, on occasions, cause an emergency termination of the stack operation due to overheat. Therefore, in this case, the temperature of the stack should be decreased by increasing the heat exchange rate of the heat exchanger, for example the heat removal rate, to lower the temperature of the diluted fuel circulating in the fuel circulation system.

On the contrary, if the ambient temperature decreases and thus the operating temperature of the fuel cell stack decrease, the heat loss occurring at the fuel cell stack or the fuel circulation system may increase, which may lower the temperature of the fuel cell stack and deteriorate the performance of the fuel cell stack, thereby lowering the efficiency of the fuel cell system. In this case, the heat loss of the stack caused by the decrease of the ambient temperature should be supplemented by decreasing the heat exchange rate of the heat exchanger, for example the heat removal rate.

In the embodiments of the present disclosure, the heat exchange rate of the heat exchanger, for example the heat removal rate, is controlled by means of feed-back control by comparing a present temperature of the fuel cell stack with the target temperature, thereby minimizing problems which may occur due to the change of the ambient temperature.

Figure 2:
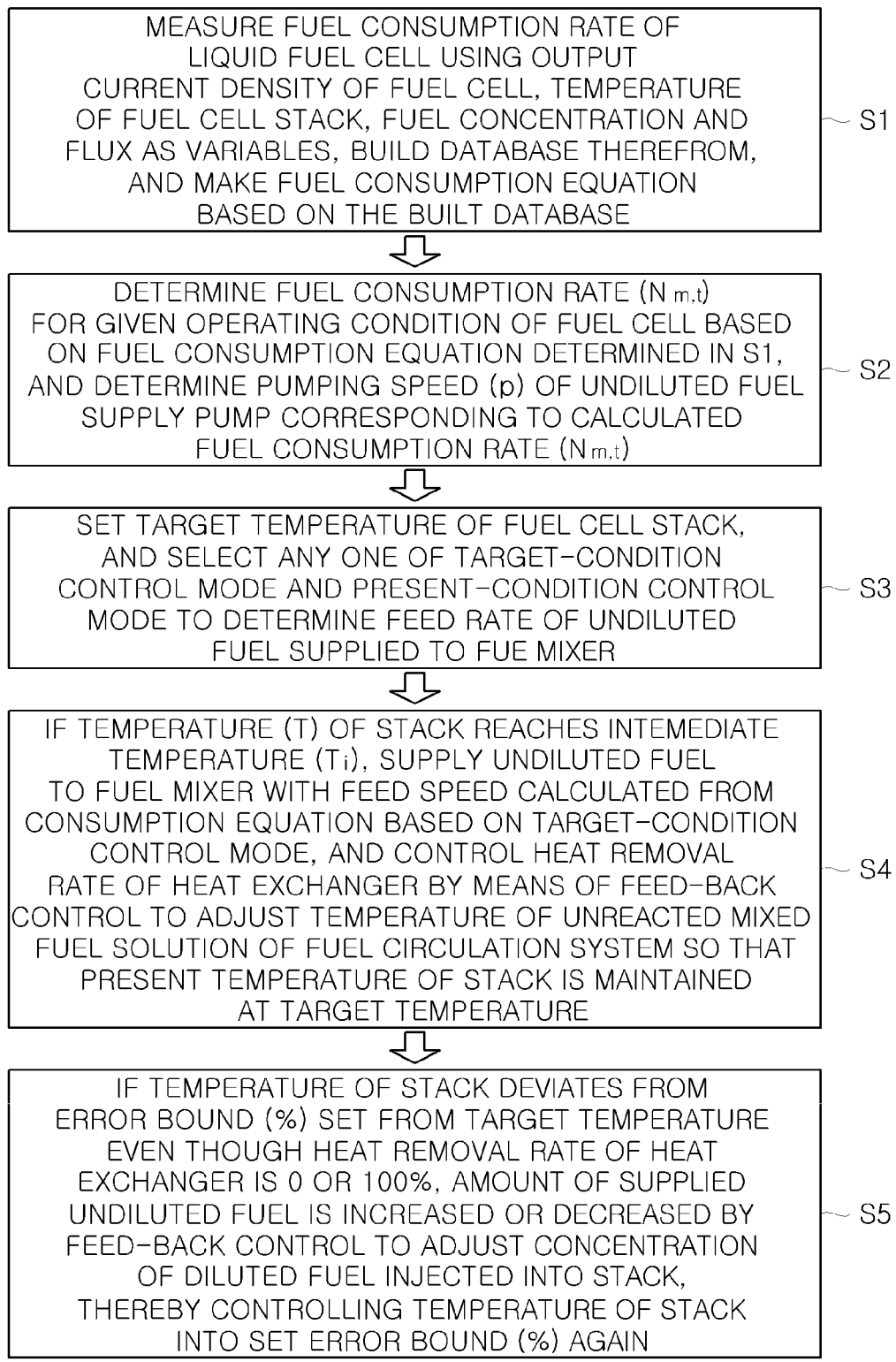
FIG. 2 is a flowchart for illustrating a method for controlling a fuel concentration and stack temperature control of a liquid fuel cell according to an embodiment of the present disclosure. For reference, a description about the flowchart in FIG. 2 is exemplified for helping understanding of the present disclosure and should not be construed to limit the scope of the present disclosure to the description.

FIG. 2 is a flowchart for illustrating a method for controlling a fuel concentration and stack temperature control of a liquid fuel cell according to an embodiment of the present disclosure. For reference, a description about the flowchart in FIG. 2 is exemplified for helping understanding of the present disclosure and should not be construed to limit the scope of the present disclosure to the description.

As shown in FIG. 2, the fuel concentration control method according to an embodiment of the present disclosure may include steps S1 to S5.

In S1, in the liquid fuel cell, a fuel consumption rate or a fuel consumption speed is measured while changing an operating condition, namely a fuel concentration, a fuel flux or flow rate, a temperature of the fuel cell stack and an output current of the fuel cell to make a database, and then the database is utilized to make a fuel consumption equation which uses the operating condition, namely the fuel concentration, the fuel flux or flow rate, the temperature of the fuel cell stack and the output current of the fuel cell as variables.

In S2, a fuel consumption speed in a given operating condition of the fuel cell is determined based on the fuel consumption equation determined in Step S1, and a feed amount or feed speed of the undiluted fuel, for example a pumping speed (p) of an undiluted fuel supply pump serving as an undiluted fuel supply unit, is determined therefrom.

In Step S3, a target temperature of the fuel cell stack is set, and either the target-condition control mode or the present-operating condition mode is selected to determine a feed amount or feed speed of the undiluted fuel supplied to the fuel mixer, and the fuel cell system is operated.

In other words, the undiluted fuel is supplied to a fuel mixer with the undiluted fuel feed speed (for example, the pumping speed of the undiluted fuel pump) determined in Step S2 to operate the fuel cell system while controlling the diluted fuel concentration, and the pumping speed is determined by selecting either the target-condition control mode and the present-condition control mode. Accordingly, the fuel cell system may be operated while adjusting the concentration of the fuel supplied to the stack so that the temperature of the fuel cell stack reaches the target temperature.

In Step S4, if the temperature of the stack (T) reaches the intermediate temperature (Ti) (T≥Ti), the undiluted fuel is supplied to the fuel mixer with a feed speed calculated from the consumption equation based on the target-condition control mode, and the heat removal rate of the heat exchanger is controlled by means of the feed-back control to adjust the temperature of the mixed solution of the fuel circulation system so that the present temperature of the stack is maintained as the target temperature.

In other words, regardless of the control mode of Step S3, if the present temperature of the stack reaches the intermediate temperature ($T_i$), the undiluted fuel pumping speed is calculated based on the target-condition control mode, and the undiluted fuel is constantly supplied to the fuel mixer with the calculated pumping speed, so that the concentration of the diluted fuel supplied to the stack and the temperature of the stack reach a target value. In addition, in a normal state operation in which the temperature of the stack is within an error range of the target value, the heat exchanger is controlled by means of the feed-back method to adjust the temperature of the diluted fuel flowing in the fuel circulation system, so that the temperature of the stack is maintained within an error range of the target value.

Meanwhile, in Step S5, if the present temperature of the stack deviates from the error range (%) of the target temperature even though the heat exchanger is operated at maximum or minimum (namely, the heat removal rate of the heat exchanger is 0 or 100%), the pumping speed of the undiluted fuel supply pump is adjusted by means of the feed-back control to additionally increase or decrease a concentration of the diluted fuel supplied to the stack, thereby controlling the temperature of the stack into the error range of the target value.

Hereinafter, Step S1 to S5 will be described in more detail.

In an embodiment, in Step S1, the fuel concentration is controlled without a concentration sensor so that the temperature of the fuel cell stack reaches the target value, and for controlling the concentration, the flux or flow rate of the undiluted fuel supplied to the fuel circulation system is determined by calculating a fuel consumption rate of the fuel cell stack according to the fuel cell operating condition.

In this regard, the fuel consumption rate of the fuel cell stack in a certain operating condition has a relation corresponding to the operating condition and is always constant regardless of the performance deterioration of the fuel cell stack. Therefore, it is possible to measure the fuel consumption rate under a given operating condition of the fuel cell stack, and the measured fuel consumption rates or consumption speeds may be managed as a database and utilized to control the fuel concentration.

In detail, in an embodiment, in Step S1, the fuel consumption speeds of the liquid fuel cell are measured while using the operating conditions of the fuel cell, namely the output current density, the internal temperature of the fuel cell, the concentration of the diluted fuel that is supplied to the stack, and the flux or flow rate of the fuel (diluted fuel) and are managed as a database, and a fuel consumption equation is prepared based on the database.

In an embodiment, the fuel consumption speed of Step S1 may be determined as the sum of a fuel consumption speed required for generating a current at the fuel cell and the inevitable fuel loss rates when the fuel cell is in operation.

In addition, in an embodiment, the inevitable fuel loss rates may be determined by losses of fuel by fuel crossover and evaporation. In other words, the inevitable fuel loss rates may be determined as the sum of fuel losses caused by crossover of a fuel passing from an anode of the fuel cell through an electrolyte membrane to a cathode and a fuel loss caused by evaporation at a gas-liquid separator and/or a fuel mixer through which the unreacted fuel discharging from an anode outlet of the stack passes. In particular, the fuel loss caused by crossover of fuel is major.

In addition, in an embodiment, the fuel consumption speed required for generating a current may be determined by a measured current value according to the operation of the fuel cell and a Faraday constant.

For example, in the liquid fuel cell, if the fuel is methanol, the fuel consumption rate may be calculated according to the following equation.

$$N_{m,t}=N_{m,e}+N_{m,x}+N_{m,v} \quad \text{[Equation 1]}$$

[$N_{m,t}$: a total fuel consumption rate per unit time in a fuel cell, $N_{m,e}$: a fuel consumption rate per unit time according to a current generation reaction at the anode, $N_{m,x}$: a fuel consumption rate per unit time by crossover, $N_{m,v}$: a fuel loss rate per unit time due to evaporation in fuel circulating system]

The fuel consumption rate per unit time when the current is generated depends only on the intensity of current and has no relation with other operating conditions. This may be expressed like the following equation.

$$N_{m,e}=f(I)=I/6F \quad \text{[Equation 2]}$$

[$N_{m,e}$: a fuel consumption rate per unit time when a current is generated, I: current, F: a Faraday constant]

The fuel consumption rate caused by crossover through the electrolyte membrane changes according to a given operating condition of the fuel cell stack, namely an output current density of the fuel cell, internal temperature of the fuel cell and internal pressure of the fuel cell, a diluted fuel concentration, a diluted-fuel flux or flow rate, a flow rate of air supplied to the cathode or the like. In addition, the fuel consumption rate caused by crossover may also change according to a structural characteristic of the fuel cell, namely the size and shape of the fuel cell, the kind and size of a used membrane electrode assembly, the kind of catalyst used for the electrode, the kind of electrode, the kind of a used electrolyte membrane, the structure of a separator, a fuel mixer or the like.

However, in a specific fuel cell, the structural characteristic of the fuel cell, for example the size and shape of the fuel cell, is constant. Therefore, the fuel consumption rate caused by crossover depends on the operating condition and may be expressed as a following equation.

$$N_{m,x}=f(I,T,C,F_a,F_c,P) \quad \text{[Equation 3]}$$

[$N_{m,x}$: a fuel consumption rate per unit time according to crossover, I: an output current density, T: a temperature of the fuel cell stack, C: a fuel (diluted fuel) concentration, $F_a$: a flux or flow rate of the supplied dilted-fuel, $F_c$: a flow rate of the supplied air, P: an internal pressure of the fuel cell]

Generally, the fuel cell operates under the condition of a fixed fuel and air feed speed, a fixed temperature, and a normal pressure in a normal condition. Therefore, in the fuel cell stack, the operating condition giving an influence on the crossover of the fuel through the electrolyte membrane becomes four variables, namely the output current density, the internal temperature of the fuel cell, the fuel (diluted fuel) concentration and the fuel flow rate, which is expressed as a following equation.

$$N_{m,x}=f(I,T,C,F_a) \quad \text{[Equation 4]}$$

[$N_{m,x}$: a fuel consumption rate per unit time according to crossover, I: an output current density, T: a temperature of the fuel cell, C: a diluted-fuel concentration, $F_a$: a flux or flow rate of the supplied diluted-fuel]

In a given fuel cell system, most of fuel loss due to evaporation in fuel circulating system occurs in a fuel mixer and/or gas-liquid separating device. The loss may depend on a temperature of diluted fuel in a gas-liquid separating device ($T_m$), an ambient temperature surrounding a fuel cell system ($T_e$), a flow rate of diluted fuel ($F_a$), and may be expressed as follows.

$$N_{m,v} = f(T_m, T_e, F_a) \qquad \text{[Equation 5]}$$

The fuel loss rate ($N_{m,v}$) may be obtained by thermodynamic calculation and real measurement. However, since the fuel loss due to the evaporation is relatively very small comparing to other fuel consumption due to other factors and as well such evaporation loss may be minimized using condenser, the fuel loss rate may be ignored in calculating fuel consumption.

In summary, the fuel consumption rate caused by crossover in a normal ambient pressure condition is determined by four variables, namely the output current density, the internal temperature of the fuel cell, the fuel (diluted fuel) concentration and the diluted-fuel flux or flow rate, and the consumption speed of the fuel consumed when a current is generated may be determined only with a current amount (an output current density). For this reason, the entire fuel consumption speed may be determined according to the output current density, the internal temperature of the fuel cell, the fuel (diluted fuel) concentration and the fuel flux or flow rate.

Therefore, in the embodiment of the present disclosure, the fuel consumption speed is measured while changing the operating conditions such as the output current density, the temperature of the fuel cell, the fuel (diluted fuel) concentration and the flux or flow rate to build a database, a fuel consumption equation using the operating conditions as variables is obtained therefrom, and a fuel consumption speed in a specific operating condition of the fuel cell is expected from the fuel consumption equation. If the fuel loss due to evaporation is large enough not to be ignored, then the total fuel consumption rate may be corrected by measuring and reflecting the fuel loss.

In an embodiment, in Step S2, based on the fuel consumption equation determined in Step S1, a fuel consumption speed in a given operating condition of the fuel cell is determined. At this time, according to the fuel consumption speed ($N_{m,t}$) calculated according to the given operating condition, the feed amount or feed speed of the undiluted fuel, for example a pumping speed (p) of the undiluted fuel pump, may be determined.

In an embodiment, in Step S3, a target temperature of the fuel cell stack is set, and the fuel cell is operated. Here, the concentration of the diluted fuel supplied to the stack may be controlled by selecting one of the present-condition control mode and the target-condition control mode as shown in FIG. 3 and supplying an undiluted fuel to the fuel mixer so that the fuel cell stack reaches the target temperature.

Figure 3:
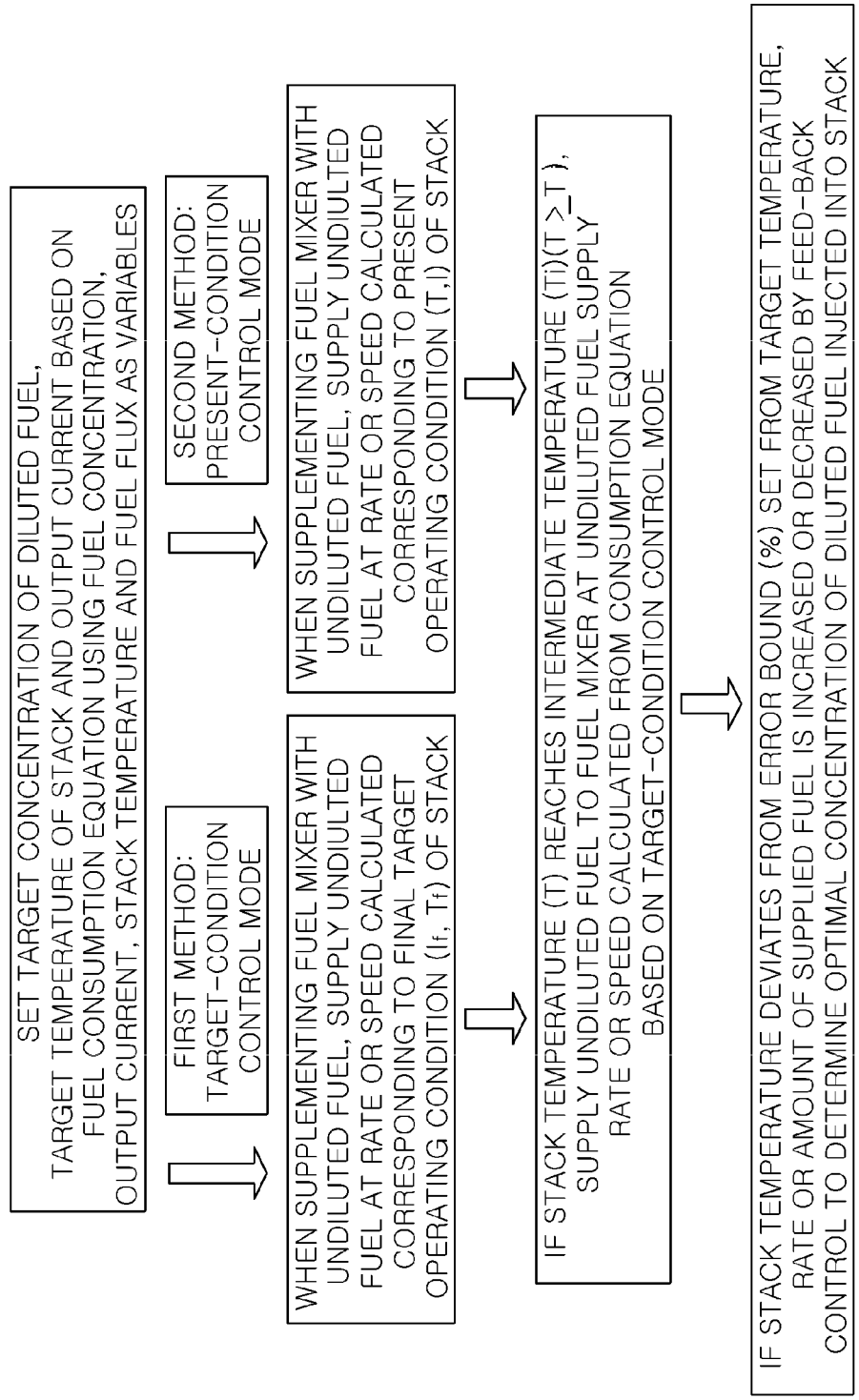
FIG. 3 is a flowchart for illustrating an operation for controlling a fuel concentration of the liquid fuel cell according to an embodiment of the present disclosure (Operations S3 to S5). For reference, a description about the flowchart in FIG. 3 is exemplified for helping understanding of the present disclosure and should not be construed to limit the scope of the present disclosure to the description.

FIG. 3 is a flowchart for illustrating an operation for controlling a fuel concentration and temperature of the liquid fuel cell without using a concentration sensor according to an embodiment of the present disclosure (Step S3 to S5).

Figure 5A:
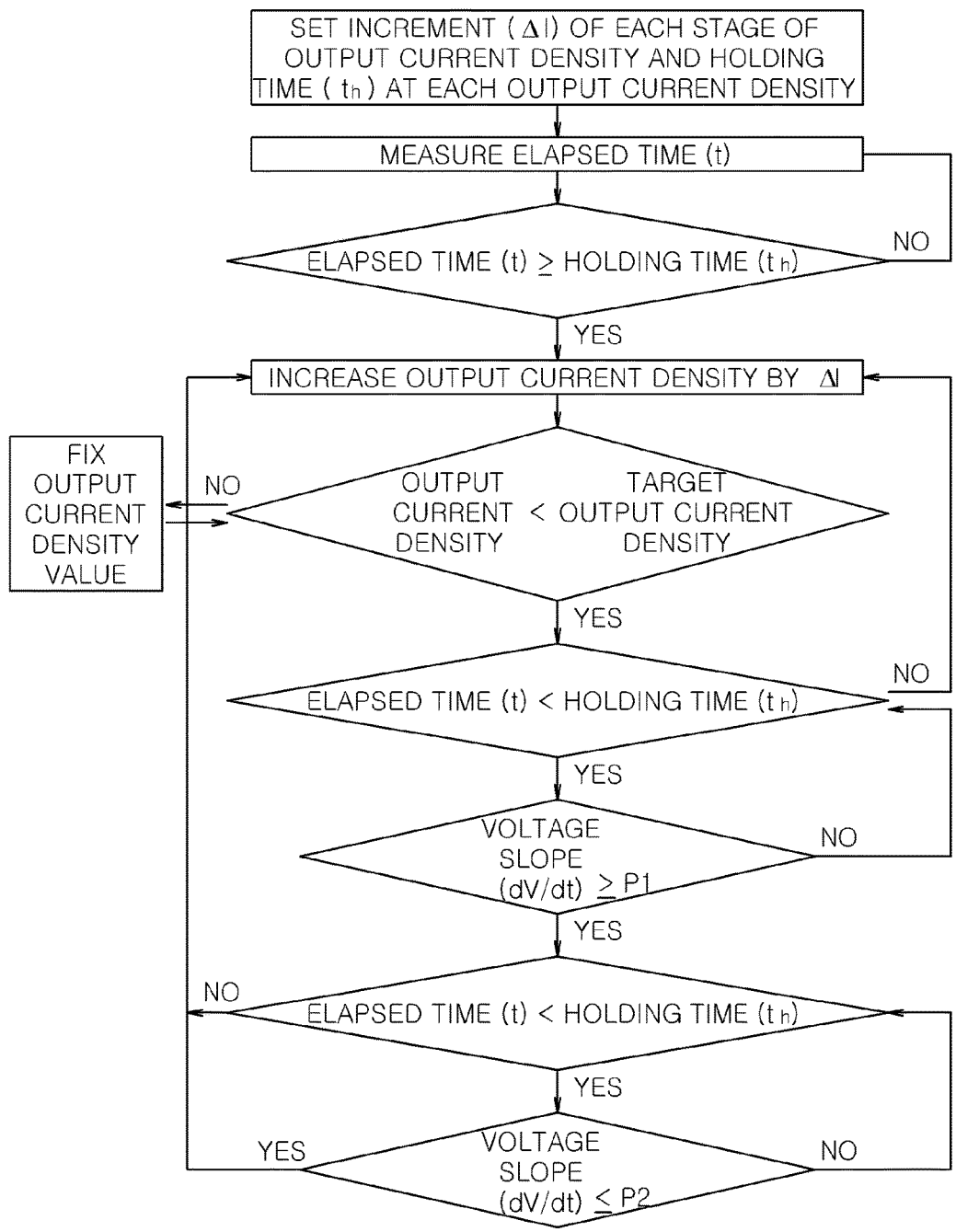
FIG. 5a is an algorithm for performing a startup of a liquid fuel cell by controlling an output current density according to an embodiment of the present disclosure. For reference, a description about the algorithm in FIG. 5a is exemplified for helping understanding of the present disclosure and should not be construed to limit the scope of the present disclosure to the description.

In the target-condition control mode, which is also called a first method, as shown in FIG. 5a, when an undiluted fuel is supplemented to the fuel mixer in the startup stage of the fuel cell, the undiluted fuel is supplemented at a pumping speed as much as the amount consumed in a final target operating condition regardless of a present temperature of the stack and an output current (see Equation 6 below).

$$p(T,I) = p(T_f, I_f) \qquad \text{[Equation 6]}$$

(where T=a present temperature of a stack; $T_f$=a final target temperature of a stack; I=an output current of a stack; $I_f$=a final target output current of a stack)

In the present-condition control mode, which is also called a second method, as shown in FIG. 4, an intermediate temperature ($T_i$) is set, so that below the intermediate temperature, the undiluted fuel feed speed is supplied at a speed calculated corresponding to the present operating condition (T, I), and above the intermediate temperature, the undiluted fuel is supplied as much as a fuel consumption speed consumed in the final fuel cell operating condition ($T_f$, $I_f$) (see Equation 7 below).

$$\text{if } T < T_i, p(T,I) = p(T,I);$$

$$\text{if } T \geq T_i, p(T,I) = p(T_f, I_f) \qquad \text{[Equation 7]}$$

where p=a pumping speed of the undiluted fuel pump, which is a function of temperature (T) and current density (I).

In an embodiment, the intermediate temperature ($T_i$) may be lower than the final target temperature by 5 to 30° C.

The present-condition control mode, called the second method, may be used if the fuel mixer has a sufficient fuel concentration at the startup stage of the fuel cell stack. In an embodiment, the sufficient fuel concentration means a value of 0.5M or above. Meanwhile, the target-condition control mode, called the first method, may be used to shorten the time required for reaching the final target concentration, output current and temperature since at the startup stage of the fuel cell stack, the feed speed of the undiluted fuel supplemented to the fuel mixer is relatively higher than that of the second method and therefore the concentration of the diluted fuel supplied to the stack is higher.

In an embodiment, in Step S3, while the temperature of the fuel cell stack is increasing to the target temperature, a control signal of the heat exchanger is set to be '0' so that the heat exchanger is not used, thereby shortening the time required for the temperature of the stack to reach the final target temperature.

In an embodiment, in Step S4, in a normal state operation in which the concentration of the fuel supplied to the stack is constantly maintained, the heat removal rate of the heat exchanger is controlled by a controller so that the present temperature of the stack is maintained substantially identical to the target temperature. If the present temperature of the fuel cell stack is lower than the target value, the heat removal rate of the heat exchanger is decreased to raise the temperature of the unreacted mixed solution circulating in the fuel circulation system, and if the present temperature is higher than the target value, the heat removal rate of the heat exchanger is increased to lower the temperature of the unreacted mixed solution, thereby controlling the temperature of the stack (feed-back control). Here, the heat removal rate of the heat exchanger may mean the control of a fan speed of the heat exchanger.

Since the temperature of the fuel cell stack is influenced by the size and performance of the heat exchanger connected to the fuel circulation system, the size and performance of the heat exchanger may be determined according to the size and characteristic of the fuel cell stack.

In an embodiment, in Step S5, if the temperature of the fuel cell stack increases or decreases to depart from the set range (%) of the target value, the feed amount or feed speed of the undiluted fuel supplied in Step S4 (namely, the feed amount or feed speed of the undiluted fuel according to the target-condition control mode) is additionally increased or decreased by means of feed-back control to adjust a concentration of the fuel injected into the stack, thereby controlling the temperature of the stack within the set range.

Here, the temperature of the stack may deviate from the set range (%) of the target value, for example, when the ambient temperature abruptly changes to cause a great changes of direct heat discharge from the stack, when the temperature of the unreacted mixed solution circulating in the fuel circulation system greatly changes due to another factor, or when there occurs an unexpected situation by which the concentration of the unreacted mixed solution cannot be controlled constantly (when a physical defect occurs at the system).

If such an abnormal situation occurs, even though the heat exchanger output quantity is controlled to be 0% or 100% in Step S4, the present temperature of the stack may not be maintained within the set range. Therefore, in Step S4, the undiluted fuel feed amount or speed, for example the pumping speed of the undiluted fuel supply pump, is additionally increased (when the present temperature of the stack decreases below the set range) or decreased (when the present temperature of the stack increases above the set range) by the feed-back controller to additionally increase or decrease the concentration of the diluted fuel supplied to the stack, thereby controlling the temperature of the stack within the error range of the target value.

That is, in an embodiment, when the stack temperature control using the heat exchanger is ongoing, the control of undiluted fuel supply unit for example undiluted fuel supply pump is also being performed additionally. Herein, the heat exchanger and the undiluted fuel supply pump may be simultaneously and respectively controlled by different feed-back controllers.

Figure 4A:
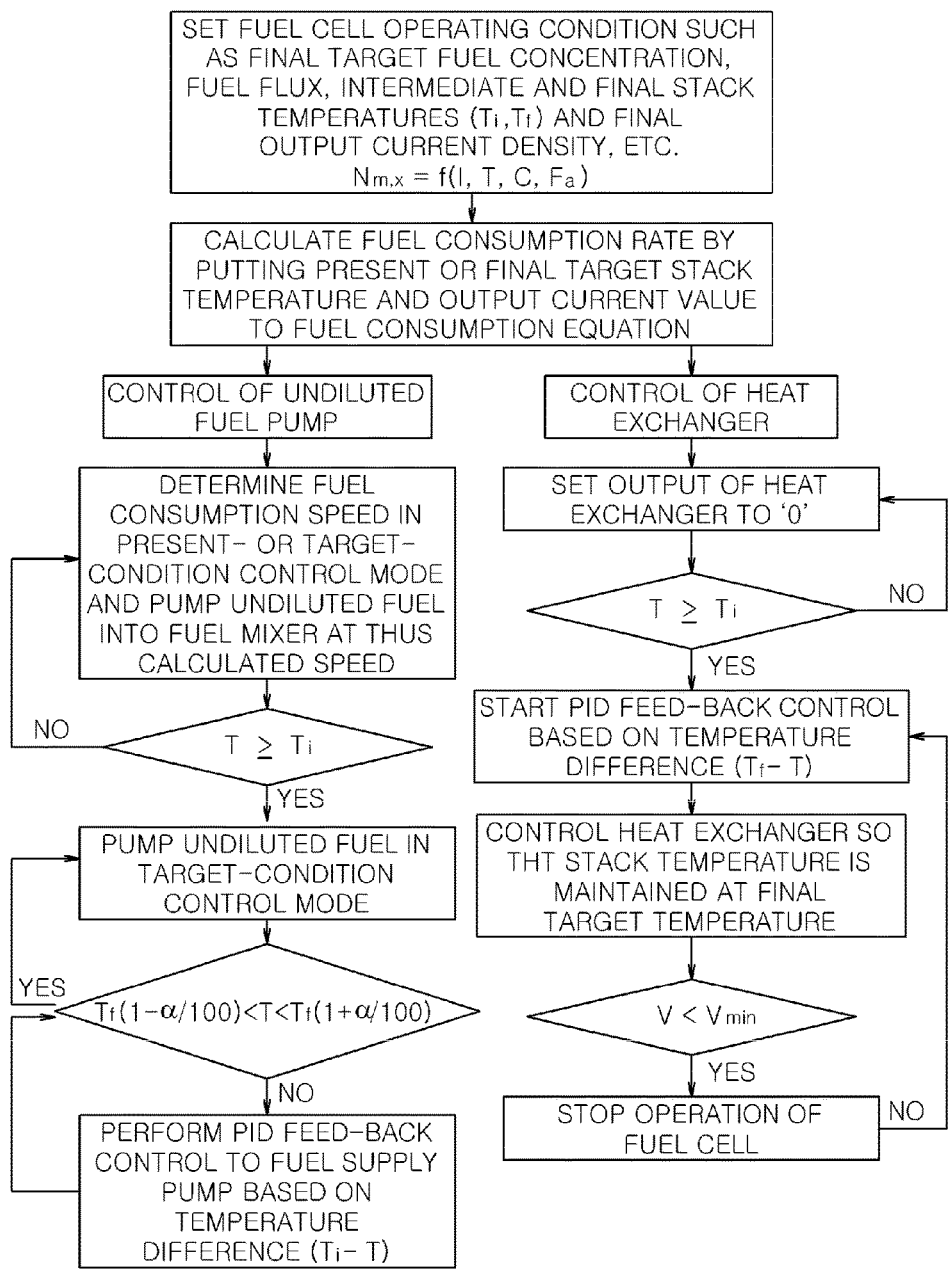
FIG. 4a is an algorithm for illustrating fuel concentration and temperature adjustment, performed by a control device according to an embodiment of the present disclosure. For reference, a description about the algorithm in FIG. 4a is exemplified for helping understanding of the present disclosure and should not be construed to limit the scope of the present disclosure to the description.

FIG. 4a is an algorithm for illustrating fuel concentration and temperature adjustment, performed by a control device according to an embodiment of the present disclosure. For reference, a description about the algorithm in FIG. 4a is exemplified for helping understanding of the present disclosure and should not be construed to limit the scope of the present disclosure to the description.

In an embodiment, in operations performed after Step S3, the temperature of the fuel cell stack and concentration control method may be explained with the algorithm of FIG. 4a. The algorithm of FIG. 4a is briefly classified into two parts. One part is directed to a feed-back control method for controlling a flux or flow rate of an undiluted fuel supplied to the fuel mixer in order to control a concentration of the diluted fuel supplied to the stack (concentration control using undiluted fuel supply pump), and the other part is directed to a feed-back control method for controlling a heat exchanger in order to control the temperature of the stack (temperature control using heat exchanger).

In an embodiment, the fuel concentration control method of the liquid fuel cell determines the pumping speed (p) of the undiluted fuel pump according to the fuel consumption rate ($N_{m,t}$) calculated as the present or target-condition control mode, and initiates the fuel cell startup while supplying the undiluted fuel to the fuel mixer at the determined pumping speed, so that the temperature of the fuel cell stack (T) reaches the intermediate temperature ($T_i$) (see FIG. 4a).

When executing Step S4 based on the temperature control, if the temperature of the stack (T) reaches the intermediate temperature ($T_i$) (T≥$T_i$), the undiluted fuel is supplied to the fuel mixer at the flux (feed amount) or flow rate (feed speed) of the undiluted fuel calculated from the consumption equation based on the target-condition control mode, and the heat removal rate of the heat exchanger is controlled by means of the feed-back control to adjust the temperature of the mixed solution of the fuel circulation system so that the present temperature of the stack may be maintained at the target temperature (see FIG. 4a).

Figure 6:
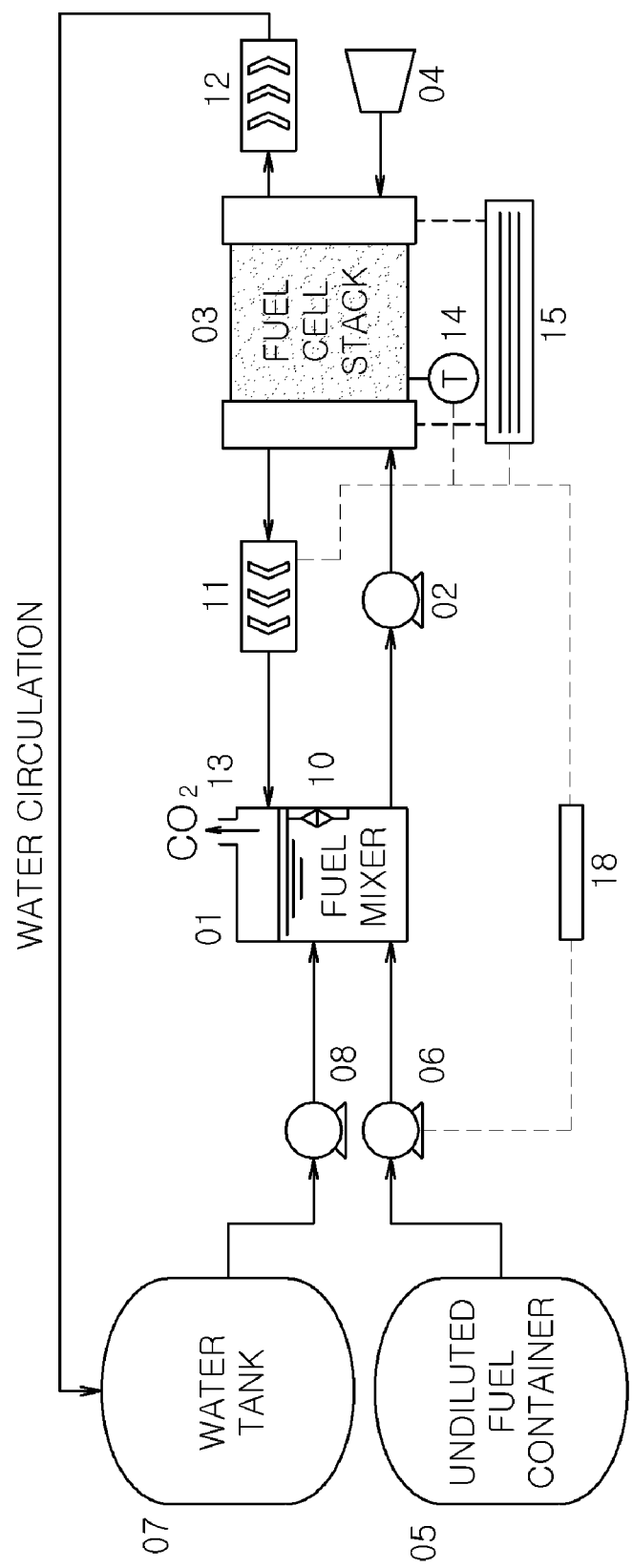
FIG. 6 is a schematic view showing a liquid fuel cell apparatus without a concentration sensor according to an embodiment of the present disclosure.

For reference, in embodiments of the present disclosure, the feed-back control is performed to control the heat removal rate of the heat exchanger and the pumping speed of the undiluted fuel. To perform the feed-back control, the feed-back control may be programmed to be performed by a control device 18 (FIG. 6).

In the feed-back control, for example, a P (Proportional), PI (Proportional Integral) or PID (Proportional Integral Derivative) control method, preferably PID feed-back control may be used. The PID feed-back control is a representative feed-back control method most frequently used in the actual applications.

The feed-back control measures a temperature of the fuel cell stack, compares the temperature of the fuel cell stack with the target temperature of the target ($T_f$, final target temperature) to calculate an error, and calculates a control value required for adjusting an output quantity of the heat exchanger and/or a fuel feed amount or speed of the undiluted fuel supply pump by using the error (see FIG. 4a).

The above error value is calculated by comparing the final target temperature ($T_f$) of the stack with the present temperature (T) of the stack and may be expressed like the following equation.

$$e(t) = T_f - T \qquad \text{[Equation 8]}$$

[e(t): a temperature error, $T_f$: a final target temperature of a fuel cell stack, T: a present temperature of a fuel cell stack]

The above error may be used in each scaling part, integral part and derivative part when calculating an output quantity of the feed-back control, and a standard PID feed-back control is configured to calculate a control value by adding the three parts in the following equation.

$$u(t) = K_p e(t) + K_i \int_0^t e(t)\,dt + K_d \frac{d}{dt} e(t) \qquad \text{[Equation 9]}$$

[u(t): an output quantity calculated by the controller, $K_p$: a scaling factor in a scaling part, e(t): error, $K_i$: an integration coefficient in a integral part, $K_d$: a differential coefficient in a derivative part]

As described above, the output quantity of the PID feed-back control is proportional to an error value, integral of the error value, and a derivative of the error value, respectively. The scaling part plays a role of controlling proportion to the scale of the error value which corresponds to an error bound obtained by comparing a present temperature of the stack in a present state with a target temperature, the integral part plays a role of enhancing the control accuracy by removing an offset occurring in the normal state (or the steady-state), and the derivative part plays a role of reducing an overshoot by preventing an abrupt change of the output value and improving the stability of stack operation by restraining the variation of an error signal.

The feed-back control may employ a standard pattern using all of the scaling, integral and differential items, similar to the PID feed-back control, but on occasions may have a slightly transformed pattern. The feed-back control may be simplified to have only a scaling item, only scaling and integral items, or only scaling and differential items, which are respectively called P, PI and PD controllers.

The output quantity of the feed-back control may be set to have an upper limit or a lower limit of the output quantity by designating a specific control range. This setting condition may cope with a controller output saturation when an error value is too high or too small due to reasons, for example, that a temperature sensor or a setting error for the target temperature occurs. The output quantity from the controller may continue to change according to the error value transmitted in real time. Herein, if a processing of the transmitted error value is not performed immediately but delayed, then the error value may increase more by the integral part, thereby reach a saturation state due to a increase of the output quantity of the integral part. The designation of the specific control range may be useful in case that upper limit or lower limit keeps coming out although the output quantity should increase or decrease otherwise. The method of setting the specific control range of the output quantity may be expressed like the following equation.

If $u(t) \geq u_{max}$, then $u(t) = u_{max}$ = upper limit of the output value (%)

If $u(t) < u_{min}$, then $u(t) = u_{min}$ = lower limit of the output value (%) [Equation 10]

[u(t): an output quantity calculated by the controller, $u_{max}$: an upper limit of the output quantity, $u_{min}$: a lower limit of the output quantity]

The upper limit or the lower limit may be set to be $100 \pm \alpha (\alpha = 1 \sim 50\%$ or $20 \sim 50\%)$ of the output quantity calculated based on the operating condition.

Hereinafter, Operations S4 and S5 will be described in more detail based on specific examples.

Figure 4B:
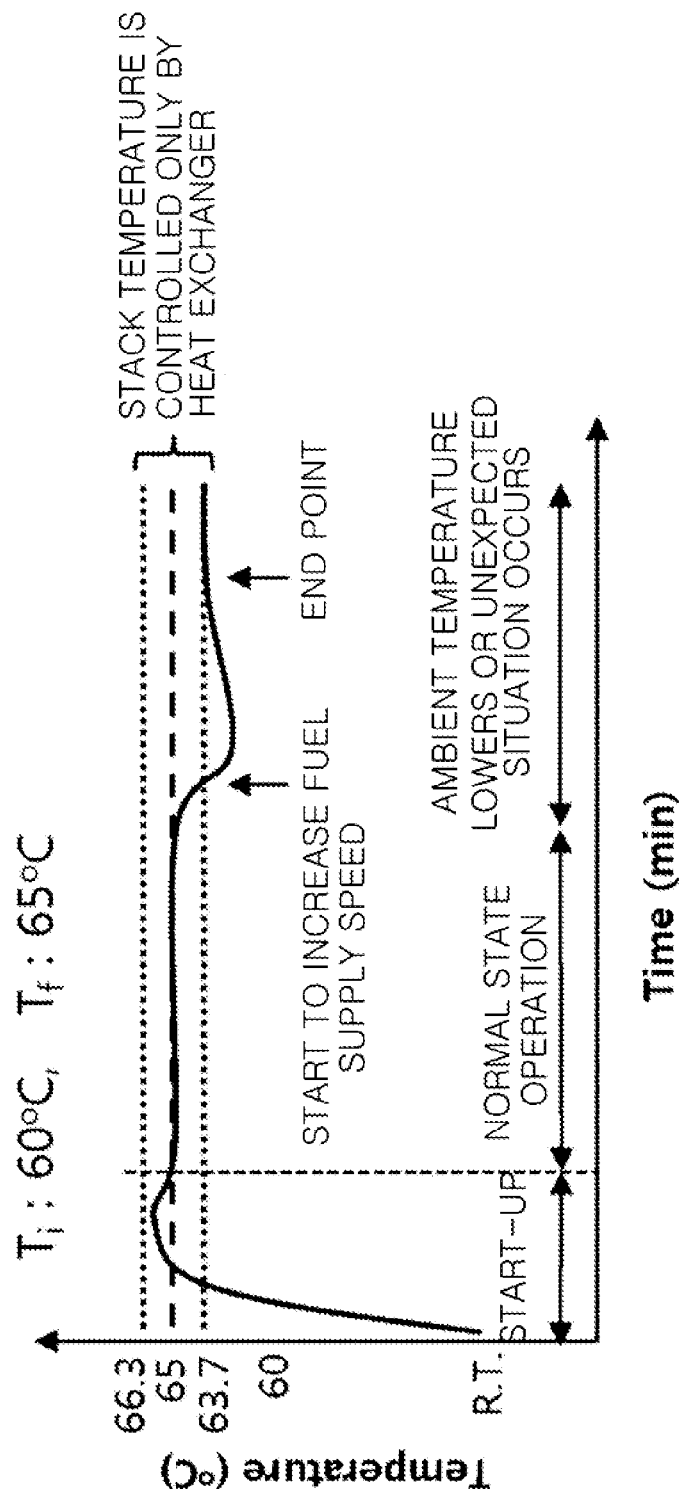

FIGS. 4b and 4c are graphs showing the variation of a temperature of the stack and a corresponding temperature control method, and the resultant variation of a temperature of the stack. Here, FIG. 4b shows the case including a startup period, and FIG. 4c shows the case not including the startup. In FIGS. 4b and 4c, X axis represents time (minute), and Y axis represents temperature (° C.). In FIGS. 4b and 4c, the control range of the heat exchanger is designated within 2% of 65° C., and the present temperature of the stack deviates from a specific set range of the target value (2% in this case). For better understanding, FIGS. 4b and 4c will be described together with FIG. 4a.

In the case the intermediate temperature ($T_i$) of the stack is set to be 60° C. and the final target temperature ($T_f$) is set to be 65° C., if the temperature of the stack reaches 60° C. set as the intermediate temperature ($T_i$) ($T \geq 60°$ C.), the feed amount or feed speed of the undiluted fuel supplied to the fuel mixer is changed into a value corresponding to the final target operating condition (the target-condition control mode) and fixed. By doing so, the concentration of the fuel supplied to the stack is maintained constantly. At this time, the temperature of the stack is maintained identical to 65° C. set as the final target temperature ($T_f$) by controlling the heat removal rate of the heat exchanger by the feed-back controller to adjust the mixed solution temperature of the fuel circulation system (see FIGS. 4b and 4c).

As described above, the normal state operations means that the temperature of the fuel cell stack may be controlled to be maintained within the error range of the final target temperature ($T_f$) and also the output current of the fuel cell stack may reach a preset target output current. Herein, the temperature of the stack may be maintained as the target value by controlling the heat exchanger alone or together with the undiluted fuel pump control.

Meanwhile, in Step S4, during the normal operation of the fuel cell stack, the temperature of the stack may gradually depart from the target temperature due to an abrupt change of the ambient temperature or inaccurate fuel concentration control (see FIGS. 4b and 4c). This means that the temperature of the fuel cell stack is not controlled within the preset error range from the target temperature even though the heat removal rate of the heat exchanger is controlled to be 0 or 100% by the feed-back controller.

In an embodiment of the present disclosure, in Step S5, in the above specific situation, if the temperature of the stack deviates from the error range set from the target temperature even though the heat removal rate of the heat exchanger is 0 or 100%, the amount of supplied fuel is increased or decreased by the feed-back controller to adjust the concentration of the fuel injected into the stack (see FIG. 4a).

In Step S5, the output quantities of the heat exchanger and the undiluted fuel supply pump are controlled simultaneously by different feed-back controllers. If the temperature of the fuel cell stack is controlled within the set error range (%) from the target temperature, the temperature of the stack is controlled again by only the PID feed-back controller of the heat exchanger. At this time, the error range (a) set from the target temperature may be 2 to 10%, preferably 2 to 5%.

In FIG. 4b showing an embodiment of the present disclosure, the final target temperature is set to be 65° C. and the error range is set to be 2%, so that the lower limit and the upper limit are respectively set to be 63.7° C. and, 66.3° C. If the temperature of the fuel cell stack lowers below the lower limit (63.7° C.), the feed-back controller of the undiluted fuel supply pump increases the fuel feed speed greater than an existing set value. Here, the term 'existing set value' indicates a fuel feed speed calculated based on the target operating condition (the target-condition control mode). At this time, the increased fuel feed speed is calculated and determined by comparing the target temperature of the stack with the present temperature by the feed-back controller.

FIG. 4c is a diagram for illustrating a situation opposite to FIG. 4b. In FIG. 4c, if the temperature of the fuel cell stack rises above the upper limit (66.7° C.), the feed-back controller of the undiluted fuel supply pump further decreases the fuel feed speed lower than a speed set based on the target-condition control mode.

According to FIGS. 4b and 4c of this embodiment, if the temperature of the stack approaches the target temperature and is controlled within the preset error range (%), the abnormal state control method based on Step S5 is terminated, and then the temperature of the stack is controlled again by using the normal state control method using only the heat exchanger as in Step S4.

Here, the abnormal state temperature control method means that the undiluted fuel supply pump is additionally controlled when the temperature of the stack is controlled using a heat exchanger, and the heat exchanger and the undiluted fuel supply pump are controlled simultaneously, in an embodiment, for example, by different feed-back controllers. At this time, the changing output quantity of the undiluted fuel supply pump is increased or decreased from the value set during the normal state control process, thereby controlling the concentration of the diluted fuel supplied to the stack.

In an embodiment, in Step S5, while operating the fuel cell, it is checked whether the output voltage of the fuel cell stack lowers below the lower limit ($V_{min}$), and if the output voltage of the fuel cell lowers below the lower limit, the operation of the fuel cell system is terminated.

In operation of the fuel cell, the output voltage of the stack is always monitored. Thus, if the output voltage lowers below a lower limit (hereinafter, a lowermost voltage), the voltage is measured continuously five times repeatedly, and if the voltage continues decreasing, the operation of the fuel cell system is terminated.

In an embodiment, the lowermost voltage is set to be 0.1 to 0.3V per unit cell, preferably 0.1 to 0.2V per unit cell.

In addition, in the normal state operation, if the temperature of the stack keeps increasing above an upper limit (hereinafter, the uppermost temperature), and if the temperature does not decrease but keep increasing even though the undiluted fuel feed speed is lowered below a speed corresponding to the target-condition, the operation of the fuel cell system may be terminated. In an embodiment, the uppermost temperature is 80 to 100° C., preferably 85 to 95° C.

In an embodiment, during the feed-back control respectively employed in Step S4 and S5, different PID values (scaling, integral and derivative coefficients) may be set. At this time, the output quantity from the controller is influenced by the PID values. The PID values should be adequately set to be suitable for corresponding conditions according to the size and performance of the fuel cell stack.

Meanwhile, setting the PID values as suitable values to obtain a desired operation at the fuel cell is called tuning. There are various tuning methods such as a Ziegler & Nichols tuning method, but it is difficult to actually apply these tuning methods to the PID feed-back controller. Most tuning equations use process parameters such as a process gain, a delay time and a time constant, but it is not easy to obtain these values.

Only the Ziegler & Nichols tuning method may lead a control loop to sustained oscillation without using the above parameters and thus determine PID variables from the gain at that time and the sustained oscillation, but in an actual process, it is difficult to lead the control loop to a stable limit.

At this time, if an auto-tuning function for automatically setting the PID values is used, even though the PID values are not calculated and set one by one by operating the fuel cell stack, it is possible to automatically determine PID values and operate the fuel cell without the above difficulty by applying the PID values to the PID feed-back controller.

The auto-tuning function may set PID values by using the PID feed-back controller at which a separately provided auto-tuning function is installed. Therefore, in an embodiment, the PID feed-back controller having an auto-tuning function may be used.

Meanwhile, in the embodiment, controlling an output current during the startup of the fuel cell stack may be further included.

During the startup of the fuel cell stack, the output current may be controlled separately from or together with the fuel concentration control, and the output current may be slowly increased by means of the feed-back method while observing the voltage change rate of the fuel cell stack according to the increase of the output current.

During the startup period in which the fuel cell system turns on and starts operating, an initial current generated by the stack is 0 mA/cm$^2$, and the temperature of the stack is identical to the ambient temperature. Therefore, if the output current is abruptly increased to the final target current, the voltage drops to 0 V, which gives an excessive burden on the fuel cell stack, and thus the output current should be slowly increased.

In a region in which the output current density (I) of a fuel cell stack is lower than the final output current density ($I_{st}$), the output current density is increased from 0 by each ΔI (mA/cm$^2$), stays at each current value for a predetermined holding time ($t_h$), and then is increased again by ΔI to the next current density stage. This process is repeated so that the output current density is increased to the final target current density ($I_{st}$). For example, each increment (ΔI) of the output current density is set to be 5 to 100 mA/cm$^2$, preferably 20 to 50 mA/cm$^2$, based on the electrode area of a unit cell so that the output current density is slowly increased step by step.

In the fuel cell operation initiating stage, the operation of increasing a current is performed using an algorithm different from that of the operation for controlling a stack temperature and a fuel concentration, and is performed like the algorithm depicted in FIG. 5a.

FIG. 5a is an algorithm for performing a startup of a liquid fuel cell by controlling an output current density according to an embodiment of the present disclosure. For reference, a description about the algorithm in FIG. 5a is exemplified for helping understanding of the present disclosure and should not be construed to limit the scope of the present disclosure to the description.

Figure 5B:
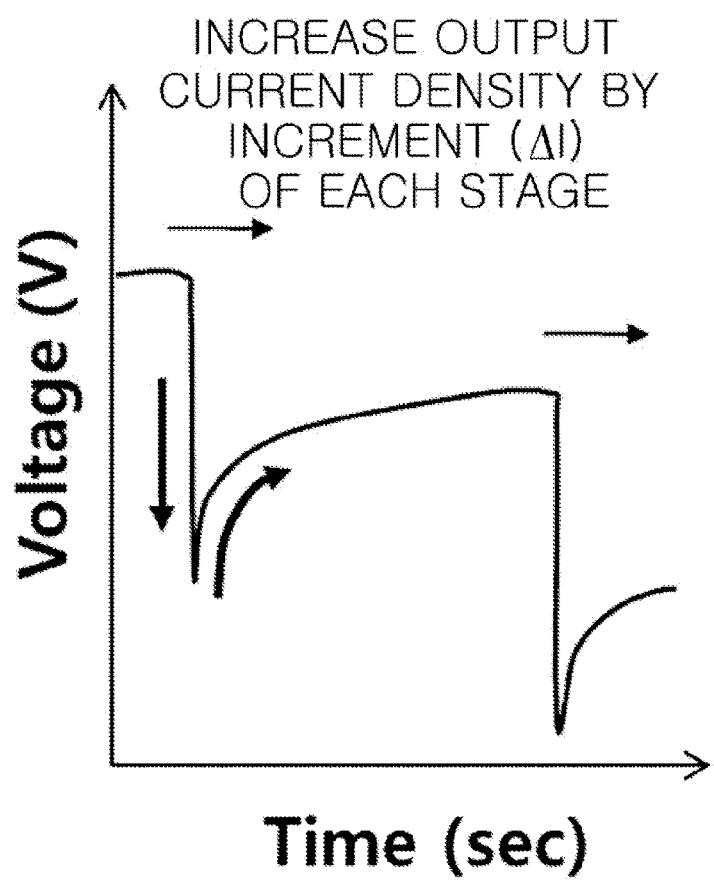
FIGS. 5b and 5C are graphs showing the variation of voltage (FIG. 5b) and a voltage change rate (FIG. 5c) according to time when the output current density increases in the embodiment of the present disclosure.
Figure 5C:
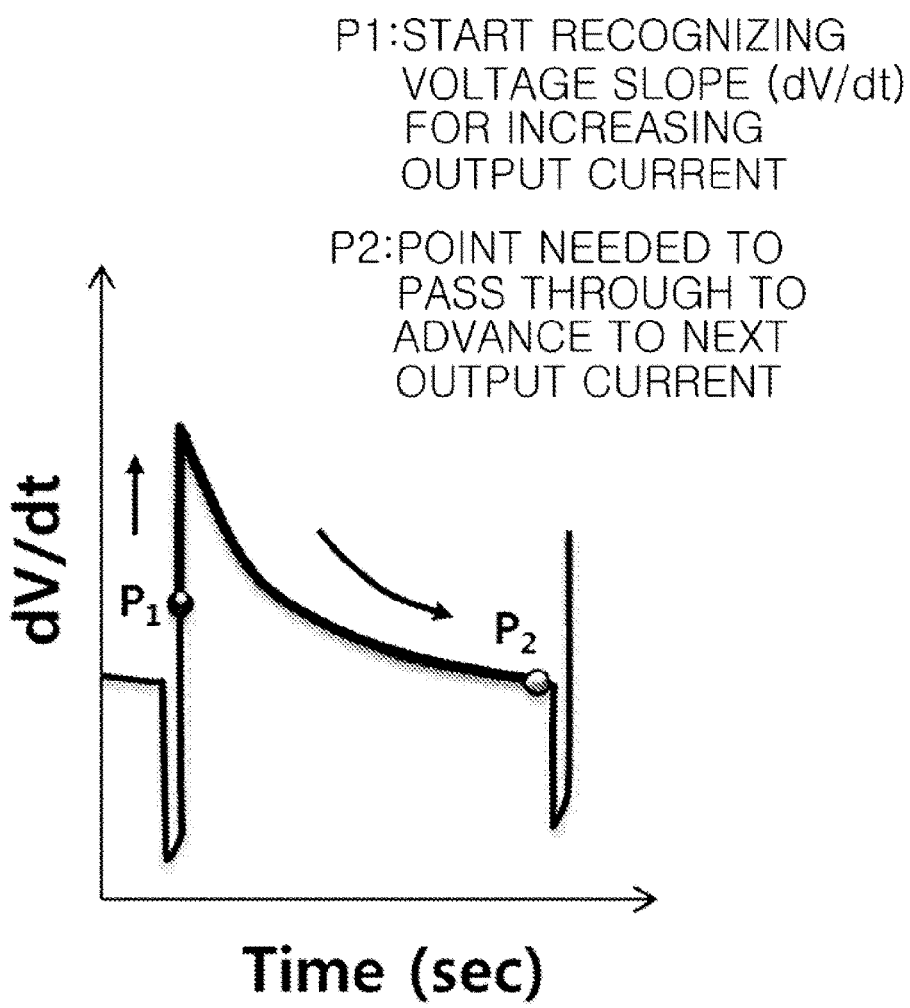

FIGS. 5b and 5C are graphs showing the variation of voltage (FIG. 5b) and a voltage change rate (FIG. 5c) according to time when the output current density increases in the embodiment of the present disclosure. In FIG. 5b, X axis represents time (second), and Y axis represents voltage (V). In FIG. 5c, X axis represents time (second), and Y axis represents a voltage change rate.

Explaining in detail referring to FIGS. 5a to 5c, prior to the initiation of the fuel cell system, first, ΔI of the output current and holding time ($t_h$) at each output current operation are set. The holding time means a time during which the output current stays at each current value, and if the holding time is elapsed, the output current increases to a next value by ΔI. The output current density controller recognizes an elapse time at the instant that each current operation initiates, and if the elapse time exceeds the holding time, the output current density is increased by ΔI. At this time, if the current is increased, the voltage of the stack is changed. As shown in FIG. 5b, when the current is increased, the voltage is abruptly decreased at first and then abruptly increased, and subsequently the voltage is slowly increased and reaches the voltage of a stabilized state.

As shown in FIG. 5c, different from the change of voltage, a voltage change rate (dV/dt) (V=voltage, t=time (second)) is abruptly decreased at first and after reaching the lowest point abruptly increased, and after reaching the highest point then is slowly decreased and converged to 0. At this time, the voltage change rate passes through two points.

In other words, the first is a voltage change rate (a first voltage change rate; P1) at a point where the voltage abruptly decreased due to the current increment of each stage is abruptly increased again, and the second is a value (a second voltage change rate; P2) at a point near 0 after the voltage slope is sufficiently decreased. The first voltage change rate may be higher than the second voltage change rate.

P1 is bigger than P2, and these values may be determined as any suitable values according to the change of voltage slope through experiments. The reason to set P1 is as follows. If the stability of current is determined only based on P2, on occasions, the voltage slope may temporarily have a value lower than P2 due to various factors even though the current of the stack is not stabilized, and in this case the current is increased to the next stage. In this case, the current may be abruptly increased without a sufficient holding time for stabilizing the voltage in each current stage, which may give an excessive burden on the fuel cell stack and cause damages.

Therefore, if the voltage change rates P1 and P2 are set and the current is increased only when the voltage change rate passes both values, the stack may be operated stably. At this time, the various factors mentioned above may include an abrupt change of a concentration of the diluted fuel supplied to the stack, an error of the voltage measuring device, an increase of temporary mass transfer resistance between reactants and products in the electrode, a flooding phenomenon in which water is accumulated in the cathode, an increase of an electric contact resistance among components of the fuel cell, or the like.

Since the region where dV/dt passes through P1 and the voltage change rate is greater than P2 still has a great voltage change, the current is maintained as is. If the voltage change rate is smaller than P2, the voltage is substantially stabilized and the fuel cell is in a stable state, and so the output current is increased again by ΔI. By repeating this process, the current is increased so that the output current reaches the final target value.

The voltage is measured every about 0.1 to 0.2 seconds. Therefore, since the voltage value fluctuates very wildly in the above minute time domain, a mean value of voltages measured for 2 to 10 seconds is used as a representative voltage value. Since the P1 and P2 values change according to size, type and characteristics of the fuel cell and operating conditions, these values are determined through experiments suitably for the corresponding fuel cell and the operating conditions. For example, the P1 value may be 0.030 or above, preferably in the range of 0.03 to 0.10, more preferably 0.04 to 0.05. The P2 value may be in the range of 0.03 to 0.005, more preferably 0.020 to 0.025 for the fuel cell stack comprising of 20 unit cells with an active electrode area of 150 cm$^2$ per cell and operating on a diluted methanol fuel concentration of 1.0M at a target temperature of 60° C. under ambient pressure.

In detail, the process of controlling an output current will be described based on an example.

In other words, in an embodiment, when increasing the output current density slowly, in a region where the output current density (I) is lower than the final output current density ($I_{st}$), the output current density may be increased slowly by setting each stage increment (ΔI) to be, for example, 10 to 100 mA/cm$^2$. That is, in case that an elapsed time reaches a holding time ($t_h$), the output current density may be increased by the increment (ΔI).

In each stage, in a state where the current is constantly maintained, if the voltage change rate (dV/dt) becomes 0.03 or above corresponding to the first point (the first voltage change rate), the process is held again until the voltage change rate becomes 0.025 which is the second point. If the voltage change rate reaches the second point (the second voltage change rate) and becomes 0.025 to 0.01 V/sec or below, the current is increased again by a predetermined amount, thereby proceeding to the next stage. In case the voltage change rate does not fullfil the requirements to pass through the P1 and P2 values, then the output current density is increased by the increment (ΔI) after an elapsed time reaches a holding time ($t_h$). By repeating this process, the output current may be adjusted to reach the final target output current.

In embodiments of the present disclosure, a control device 18 (see FIG. 6) of a liquid fuel cell by means of feed-back control based on temperature control without using a concentration sensor (hereinafter, referred to as a control device) is also provided.

FIG. 6 is a schematic view showing a liquid fuel cell apparatus not including a concentration sensor according to an embodiment of the present disclosure, which depicts a fuel circulation system and a fuel cell apparatus without using a fuel concentration sensor. In FIG. 6, all components other than the concentration sensor and the pump for the concentration sensor are identical to those of FIG. 1 for convenience.

Since the fuel cell system according to an embodiment of the present disclosure has a sensor-less manner not using a concentration sensor as described above, the fuel cell system may have a simple and small design, which may reduce the parasitic power consumed for operating the concentration sensor unit and thus lower the price of the fuel cell system.

Referring to FIG. 6, in the corresponding fuel cell system, a diluted fuel is supplied from a fuel mixer 1 through a fuel circulating pump 2 to the anode of a fuel cell stack 3. In addition, in the fuel cell stack 3, air is supplied from an air blower 4 to the cathode of the fuel cell stack. The fuel mixer 1 receives an undiluted fuel from an undiluted fuel container 5 through an undiluted fuel supply pump 6.

In addition, the fuel mixer 1 receives water from a water tank 7 through a water supply pump 8, and the water tank 7 is connected to a heat exchanger type water condenser 12 installed at an outlet of the cathode of the fuel cell stack 3.

A liquid level meter 10 for measuring a surface level of a mixed fuel is installed at the fuel mixer 1 to constantly maintain the volume of the mixed fuel.

The diluted fuel supplied from the fuel mixer 1 to the anode of the fuel cell stack 3 is discharged again from the stack with a decreased fuel concentration after reaction and decreases its temperature while passing through a heat exchanger 11, and is then injected again into the fuel mixer 1 at which a vapor-liquid separator is installed.

Since the undiluted fuel supply pump 6 is connected to the fuel mixer 1, a fuel is supplied to the fuel mixer 1 as much as the amount consumed by the fuel cell stack 3 so that the concentration of the diluted fuel in the fuel mixer may have a target value.

Gas (carbon dioxide or the like) generated from the anode of the fuel cell stack 3 flows into the fuel mixer 1 via the heat exchanger 11 of the circulation system together with the unreacted fuel, passes through the vapor-liquid separator mounted at the fuel mixer 1, and then discharges out through a discharge gas discharger 13.

A temperature measuring device 14 and an output voltage and output current measuring device 15 are respectively mounted to the fuel cell stack 3 to measure a temperature, a voltage and an output current density of the fuel cell, respectively.

The anode heat exchanger 11, the temperature measuring device 14 and the voltage and output current density measuring device 15 are connected to a control device 18 and utilized for calculating a heat removal rate of the heat exchanger or a fuel consumption rate or a fuel consumption speed of the fuel cell stack.

The control device 18 may control the undiluted fuel supply pump, the heat exchanger and the output current, as described below.

In an embodiment, the control device 18 includes a processor (or microprocessor). The microprocessor may be associated with any computing device. The microprocessor may perform the simultaneous concentration and temperature control as described above.

For example, the microprocessor may perform the following:

That is, the microprocessor may be programmed to perform: determining a fuel consumption rate or consumption speed in a given operating condition based on a database of fuel consumption rates or consumption speeds of the liquid fuel cell, which database is determined according to operating conditions, and determining an undiluted fuel flux or flow rate corresponding to the fuel consumption rate or consumption speed; selecting any one of the target-condition control mode and the present condition control mode and starts an operation of fuel cell by supplying an undiluted fuel at a flux or flow rate determined accordingly; fixing the mode as the target-condition control mode so that the undiluted fuel is supplied if the temperature of the fuel cell stack reaches a predetermined intermediate temperature ($T_i$) lower than the target temperature ($T_f$), and performing a feed-back control to a heat exchange rate (for example, the heat removal rate) of the heat exchanger comparing the present temperature of the fuel cell stack with the target temperature so that the temperature of the fuel cell stack is maintained in a normal operating state where the temperature of the fuel cell stack is within a preset error bound from the target temperature ($T_f$); and if the temperature of the fuel cell stack deviates from the preset error bound from the target temperature, increasing or decreasing the undiluted fuel flux or flow rate fixed according to the target-condition control mode by feed-back control comparing the present temperature of the fuel cell stack with the target temperature so that the temperature of the fuel cell stack comes back to a normal state where the temperature of the fuel cell stack is within a preset error bound from the target temperature ($T_f$).

In an embodiment, the microprocessor may include a storage unit in which a database is built with a fuel consumption rate or consumption speed of the liquid fuel cell determined according to an operating condition; a first processing unit for calling the database in relation to the fuel consumption speed from the first processing unit, calculating a fuel consumption rate or consumption speed based on the database, and sending a signal in relation to an undiluted fuel feed amount or feed speed to an undiluted fuel supply unit (for example, an undiluted fuel supply pump); and a second processing unit (a feed-back control unit) for receiving a signal in relation to a present temperature from the temperature measuring device of the fuel cell stack, comparing the present temperature of the fuel cell stack with a target temperature to calculate an error value, calculating a control output quantity based on the error value by means of P, PI or PID manner, and sending the corresponding control output quantity to the undiluted fuel supply unit (for example, the undiluted fuel supply pump) and/or a heat exchange rate control unit of the heat exchanger (for example, a fan of the heat exchanger).

In an embodiment, the second processing unit may include a 2-1 processing unit (a feed-back control unit) for receiving a signal in relation to a present temperature from the temperature measuring device of the fuel cell stack, comparing the present temperature of the fuel cell stack with a target temperature to calculate an error value, calculating a control output quantity based on the error value by means of P, PI or PID manner, and sending the corresponding control output quantity to the undiluted fuel supply unit (for example, the undiluted fuel supply pump); and a 2-2 processing unit (a feed-back control unit) for receiving a signal in relation to a present temperature from the temperature measuring device of the fuel cell stack, comparing the present temperature of the fuel cell stack with a target temperature to calculate an error value, calculating a control output quantity based on the error value by means of P, PI or PID manner, and sending the corresponding control output quantity to a heat exchange rate control unit of the heat exchanger (for example, a fan of the heat exchanger).

In an embodiment, the microprocessor may further perform (in an embodiment, in a third processing unit, i.e. an output current controller) controlling an output current when the fuel cell is in a startup stage. The third processing unit may increase an output current density when the fuel cell is in a startup stage. In addition, in a region where the output current density (I) is lower than the final output current density ($I_{st}$), the third processing unit increases the output current density by each increment ($\Delta I$) of 5 to 100 mA/cm$^2$. In addition, in each increasing stage, if the voltage change rate (dV/dt) reaches the first voltage change rate (P1) while the current is constantly maintained, the third processing unit holds the process until the corresponding voltage change rate (dV/dt) reaches the second voltage change rate (dV/dt) (P2), and after reaching the second voltage change rate (dV/dt) (P2), the third processing unit increases the current again to proceed to the next stage. This process is repeated to control the output current to reach the final target output current density.

In an embodiment, the data storage unit may be connected to measuring devices for measuring an output current of the liquid fuel cell, an output voltage, and the internal temperature and pressure of the fuel cell stack.

In addition, in an embodiment, there is provided a liquid fuel cell apparatus, which includes a fuel cell stack, a heat exchange unit connected to the fuel cell stack, a fuel supply unit supplying a diluted fuel to the fuel cell stack, a device for measuring the fuel cell stack temperature, a device for measuring at least one of output voltage and output current of the fuel cell stack, and a control device 18 (see FIG. 6).

Here, the heat exchange unit may include a heat exchanger connected to the anode outlet of a fuel cell stack and a heat removal rate control unit controlling the heat exchange rate of the heat exchanger. The fuel supply unit may include a fuel mixer supplying a diluted fuel to a fuel cell stack and an undiluted fuel cell supply unit supplying an undiluted fuel to the fuel mixer.

The control device 18 may be connected to the device for measuring the fuel cell stack temperature, the device for measuring at least one of output voltage and output current of the fuel cell stack, the heat removal rate control unit and the undiluted fuel cell supply unit.

In an embodiment, the heat exchange unit may in particular include an anode side heat exchanger connected to an anode and a cathode side heat exchanger connected to a cathode. That is, the heat exchange unit may include the anode side heat exchanger (11) which is connected to an anode outlet of the fuel cell stack to receive a high-temperature unreacted mixed solution and supply the mixed solution lowered in temperature after heat exchange to a fuel mixer; and the cathode side heat exchanger (12) connected to a cathode outlet of the stack to receive a humidified mixed gas and supply condensed water to a water tank after heat exchange.

Further, the heat exchanger may further include a heat exchanging means (for example, a metal pipe and a metal fin: for reference, the metal fin is thin plates surrounding the metal pipes. Many of these plates are attached to the metal pipe so as to increase the surface area of the metal pipe and thus increase the area with which air contacts and in turn increase the heat exchange rate) to remove heat from the mixed fuel solution or humidified mixed gas supplied to the heat exchangers, and a heat removal means removing heat from the heat exchanging means (for example, air blowing fan supplying air to remove heat from the heat exchanging means).

The mixed fuel solution lowered in temperature through the anode side heat exchanger is supplied to a fuel mixer, the water condensed in the cathode side heat exchanger is supplied to the water tank, and the gas removed from the cathode heat exchanger is discharged outside.

In an embodiment, the air blowing fan which is a heat removal means of the anode heat exchanger (11) may be connected to the control device (18).

In an embodiment, the fuel supply unit may include a fuel mixer 1, an undiluted fuel container 5 connected to the fuel mixer, and an undiluted fuel supply unit such as a pump 6 for providing an undiluted fuel from the undiluted fuel container 5 to the fuel mixer. The control device 18 may be connected to the corresponding pump 6. The fuel supply unit may collect the unreacted fuel flowing from the fuel cell stack 3 and provide the collected unreacted fuel to the fuel mixer 1, and may also resupply the diluted fuel whose concentration is adjusted to a target value in the fuel mixer 1 to the fuel cell stack 3.

Meanwhile, in an embodiment, the liquid fuel employed by the liquid fuel cell may be at least one of reactants of methanol, ethanol, formic acid, isopropanol, propanol, ethylene glycol, dimethyl ether, butanol, hydrogen, butane, ethane, propane, carbon dioxide, water, bio fuel, and their mixtures.

Hereinafter, an embodiment of the present disclosure will be described with reference to the accompanying drawings. Even though the present disclosure is described with reference to an embodiment depicted in the drawings, the embodiment is just an example, and the spirit, essence and operation of the present disclosure are not limited thereto.

Determination of Fuel Consumption Rates and a Consumption Equation

An experiment was performed using a unit cell of a direct methanol fuel cell which use an aqueous methanol solution as a fuel. The unit cell was selected so that its temperature may be artificially adjusted. For reference, the unit cell had an active electrode area of 150 cm$^2$ and used Nafion 115 of DuPont as an electrolyte membrane. An anode electrode catalyst was Pt—Ru of 6 mg/cm$^2$, and a cathode electrode catalyst was Pt of 2 mg/cm$^2$ purchased from Johnson-Matthey Co. Graphite separators employed in the unit cell had parallel serpentine type channels, and the fuel was 1.0M (mol/L) of an aqueous methanol solution. A diluted fuel feed flux to the anode was 5.95, 8.78 and 11.7 ml/min, respectively, and an air feed flux to the cathode was 747, 1118 and 1492 ml/min (dry air), respectively. When a half cell is operated, a nitrogen or hydrogen flux was set to be identical to an air feed flux.

First, in order to build a fuel consumption speed database according to operating conditions of a current, a temperature, a concentration and a flux, the fuel cell was operated while changing the operating condition in order and at this time a fuel consumption rate of each operating condition was measured.

The fuel consumption rate when a current is generated was calculated from an output current density of the stack as proposed in the above equation, and a fuel consumption rate caused by fuel crossover was measured from a concentration of carbon dioxide contained in the gas discharging from the cathode.

An amount of carbon dioxide generated from the cathode by the fuel crossover and an amount of carbon dioxide generated from the anode and crossing over to the cathode were measured using a unit cell and a half cell.

A flux of gas discharging from the cathode when the fuel cell is in operation may be calculated by measuring a flux of gas supplied to the fuel cell cathode, namely pure oxygen or air, then subtracting an oxygen consumption rate when a current is generated from the measured value, subtracting an oxygen consumption rate used for oxidizing the crossed-over methanol, and adding an amount of carbon dioxide crossed-over from the anode to the cathode. In other words, the amount (the outflow rate) of carbon dioxide measured at the cathode outlet is the sum of the amount of carbon dioxide generated by oxidation of methanol crossed-over from anode to the cathode and the amount of carbon dioxide crossed-over from the anode to the cathode. Here, the amount of nitrogen and oxygen moving from the cathode to the anode by means of diffusion was neglected.

Figure 7:
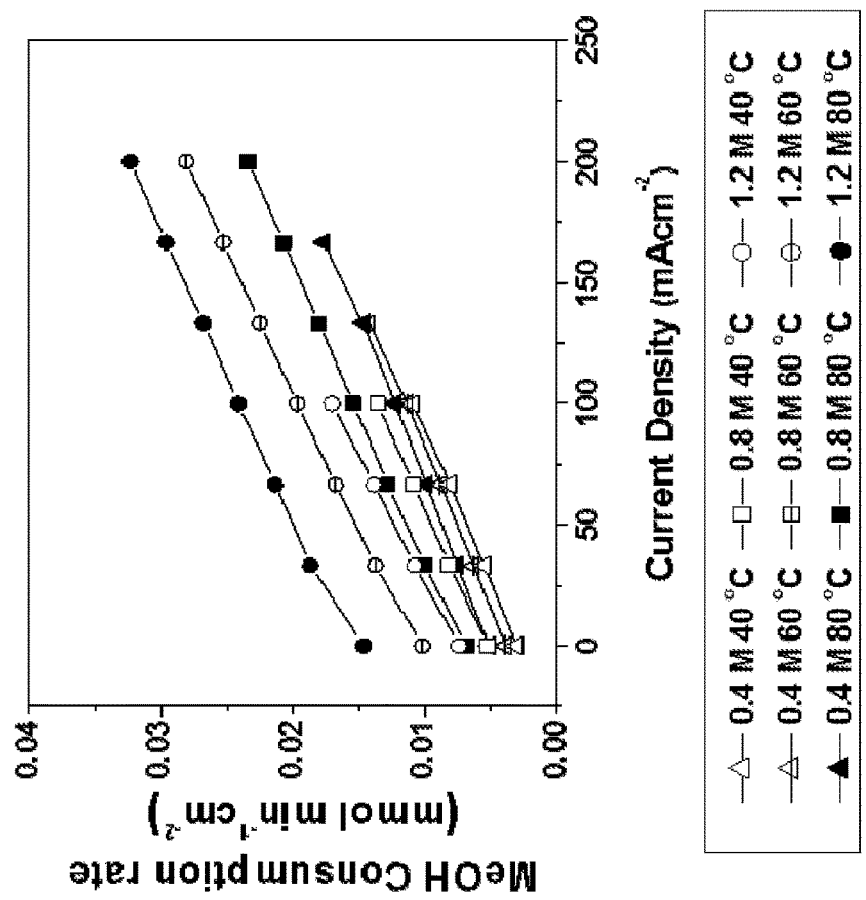
FIG. 7 shows measurement data of an output current density and a fuel consumption rate according to an internal temperature of the fuel cell, a fuel concentration and a flux under an ambient pressure condition in the embodiment of the present disclosure.

FIG. 7 shows measurement data of an output current density, an internal temperature of the fuel cell, and a fuel (methanol) consumption rate according to a fuel concentration and a flux under a normal pressure condition in the embodiment of the present disclosure. For reference, in FIG. 7, the temperature was 40, 60 and 80° C., respectively, the methanol fuel concentration was 0.4, 0.8 and 1.2 M (mol/L), respectively, and the output current density was increased from 0 A by each 5 A until the voltage is lowered to reach 0.3V.

Referring to FIG. 7, the entire methanol consumption rate exhibits a linear relation with the current over the entire range. Based on this result, a fuel consumption rate and a fuel consumption equation may be determined with the set concentration, current, temperature and flux conditions.

Output Current Control

A direct methanol fuel cell stack was prepared and the performance of the control device according to the embodiments of the present disclosure was evaluated. The stack had an active electrode area 150 cm$^2$ and was composed of twenty unit cells.

First, in an embodiment of the present disclosure, an output current increment (ΔI) was set to be 5 A, and a holding time ($t_h$) in an open circuit voltage (OCV) state was set to be 2 minutes and a holding time at different output current values was set to be 3 minutes. In addition, from the startup of the fuel cell stack, the change of voltage of the stack and dV/dt which varies according to the increase of the output current was observed.

At this time, in order to maintain a concentration of the fuel supplied to the fuel cell stack, an undiluted fuel was supplied to the fuel mixer as much as a fuel consumption speed corresponding to the present-condition control mode.

FIGS. 8a and 8b are graphs showing an example of controlling an output current density in a startup stage of the direct methanol fuel cell by means of a feed-back method in the embodiment of the present disclosure. FIG. 8a shows the case of controlling with using P1, P2, and FIG. 8b shows the case of feed-back control using P1, P2 according to an algorithm of FIG. 5a.

For reference, in FIGS. 8a and 8b, 1 denotes a voltage (V) and 2 denotes a voltage change rate (dV/dt).

Seeing the result of FIG. 8a, it may be found that after the initial operation starts, the output current is normally increased smoothly from 0A to 25 A, which is the target output current, by 5 A at a time, and the voltage is decreased step by step accordingly.

At this time, the total time taken for reaching 25 A was accurately 14 minutes. This is because the holding time for increasing the output current is set so that the holding time in the open circuit voltage (OCV) state is set to be 2 minutes and the holding time at different output current values is set to be 3 minutes.

Two minutes and three minutes set as the holding (waiting) time are values obtained from the experiments. Referring to FIG. 8a, after the output current increases by ΔI (5 A), the voltage comes into a stabilized state so that dV/dt is maintained very low, but nevertheless the process is unnecessarily held for a long time at the same output current value. By doing so, the output current increases slowly and the temperature of the fuel cell also increases slowly, which extends the time taken for reaching the target temperature for normal operation of the fuel cell.

In order to supplement this problem, the holding time in the open circuit voltage state is set to be 2 minutes as in FIG. 8a while the holding time is set to be 3 minutes in the other output current values, and when the output current increases afterwards, a control algorithm for increasing an output current density by means of feed-back as illustrated in FIG. 5a is used.

FIG. 8b shows an experiment result obtained under the above condition, in which 9 minutes are consumed to reach the target output current, which is shorter than 14 minutes of FIG. 8a by about 5 minutes. In other words, as in the improved algorithm depicted in FIG. 5a, after the output current increases by ΔI in the open circuit voltage state, dV/dt is recognized, and then the output current is increased by ΔI only when dV/dt passes through P1 and P2. If the voltage does not pass either P1 or P2 or both, then the output current is automatically increased by predetermined ΔI (5 A in this case) after 3 minutes.

At this time, it may be found that the output current is not unnecessarily held for a long time at each output current time but is rapidly increased to the final target output current, different from FIG. 8a.

Here, in the above experimental example, the set values input to the algorithm, namely P1 and P2, were respectively 0.05 and 0.02. At this time, not only the output current but also the temperature of the fuel cell increases rapidly, thereby reducing the time taken for reaching the target temperature for normal operation of the fuel cell. The experiment of FIG. 8b was performed under the same experimental conditions as FIG. 8a, and at this time the concentration of the fuel supplied to the fuel cell stack was identical to the experimental condition of FIG. 8a by supplying an undiluted fuel to the fuel mixer as much as a fuel consumption speed corresponding to the present-condition control mode.

Sensor-Less Concentration and Temperature Simultaneous Control

In the normal operation of the liquid fuel cell under a target operating condition, the temperature of the stack is constantly maintained as a target value by the heat removal rate of the heat exchanger, and the feed speed of the undiluted fuel supplied to the fuel mixer is constantly maintained by the consumption speed set according to the target operating condition (the target-condition control mode). Therefore, in the normal operation, the diluted fuel concentration is maintained at a constant value.

FIGS. 9a and 9b are graphs showing a result that the temperature of a stack is constantly maintained at a target temperature by a feed-back controller of the heat exchanger, when an undiluted fuel is supplied to a fuel mixer in a target-condition control mode, in the normal operation of the liquid fuel cell according to the embodiment of the present disclosure.

For reference, in FIG. 9a, 1 denotes a target temperature of stack, 2 denotes an error bound range set from the target temperature, 3 denotes a temperature of stack, 4 denotes a temperature of outlet of heat exchanger, 5 denotes a temperature of anode inlet of stack, 6 denotes a concentration of diluted fuel.

FIG. 9a shows the change of temperatures of the heat exchanger outlet and the anode inlet and outlet of the fuel cell stack and a methanol concentration of a diluted fuel supplied to the stack. The target temperature of the stack is set to be 65° C. and the control range of the stack temperature is set to be 63.7° C. to 66.3° C. (±2% from the target temperature). The set target temperature and the set range are depicted as dotted lines in FIG. 9a. FIG. 9a shows that the temperature of the stack is constantly controlled at 65° C., which is the target temperature, by the feed-back controller of the heat exchanger. The change of the heat removal rate by the heat exchanger feed-back controller is shown in FIG. 9b.

FIG. 9b is a graph showing the change in heat exchanger cooling rate corresponding to FIG. 9a. The heat removal rate of the heat exchanger has a value of 80 to 100% and changes according to the feed-back control of the feed-back controller (FIG. 9b). This change is determined by the feed-back controller through comparing the present temperature of the fuel cell stack with the target temperature. At this time, the feed speed of the undiluted fuel supplied to the fuel mixer is constantly maintained at a consumption speed set by the target operating condition. Therefore, the diluted fuel concentration is constantly maintained at 2.9 wt % by the consumption speed of the undiluted fuel set by the target operating condition.

Generally, the heat removal rate of the heat exchanger changes in the range of 70 to 90%, and the temperature of the stack may be controlled to be the target temperature. If the heat removal rate of the heat exchanger is constantly maintained at an extreme value, namely 0 or 100%, the temperature of the stack needs to be additionally controlled by means of the feed-back of the feed-back controller of the undiluted fuel.

FIGS. 10a and 10b are graphs showing a result of controlling a concentration of the diluted fuel based on a final target temperature, when the temperature of the stack gradually departs away from the final target temperature, in the normal operation state of the liquid fuel cell according to the embodiment of the present disclosure.

For reference, in FIG. 10a, 1 denotes a target temperature of stack, 2 denotes an error bound range set from the target temperature, 3 denotes a temperature of stack, 4 denotes a temperature of outlet of heat exchanger, 5 denotes a temperature of anode inlet of stack, 6 denotes a concentration of diluted fuel. Further, in FIG. 10b, 1 denotes a heat removal rate of heat exchanger and 2 denotes a feed rate of raw methanol.

FIG. 10a shows a control result when the temperature of the stack increases above the uppermost value (66.3° C.) which is higher than the target temperature by 2% in spite of the control of the heat exchanger in 100% operation. In this case, since the temperature of the stack may not be decreased only by the heat exchanger, a concentration of the diluted fuel supplied to the stack should be decreased, and for this, the amount of the undiluted fuel supplied to the fuel mixer should be decreased.

FIG. 10b shows that an output quantity of the undiluted fuel supply pump changes by the feed-back controller. At a point where the temperature of the stack increases over 66.3° C., the output quantity of the undiluted fuel supply pump is repeatedly decreased from 100% at least two times.

By doing so, the concentration of the fuel supplied to the stack is controlled within the range of 3.0 to 3.4 wt %, and it may be found that the temperature of the stack is controlled within the given error range without increasing further. At this time, the undiluted fuel pump is controlled within an output quantity range of 80 to 120%. If the output quantity decreases below 100%, this means that the undiluted fuel is supplied to the fuel mixer at a fuel feed speed which is lower than the fuel feed speed (100%) set by the target operating condition.

From the above, it is understood that if the method and apparatus according to the embodiments of the present disclosure is used, the fuel concentration and the temperature of the stack are maintained within certain ranges by the temperature-control based feed-back control without using a concentration sensor. In addition, by properly adjusting the heat removal rate of the heat exchanger and the pumping speed of the undiluted fuel supply pump by using separate PID feed-back controllers, it is possible to operate the fuel cell while precisely controlling the fuel concentration and stack temperature.

What is claimed is:

1. A method for simultaneously controlling a fuel concentration and a temperature of liquid fuel cell by using a temperature-control based feed-back control without using a concentration sensor, comprising:
   obtaining a database by measuring a fuel consumption rate or speed according to an operating condition of a liquid fuel cell, and preparing a fuel consumption equation according to operating conditions based on the database (S1);
   determining a fuel consumption rate or speed in a given operating condition based on the fuel consumption equation determined in Step S1, and determining an undiluted fuel feed amount or speed corresponding to the determined fuel consumption rate or speed (S2);
   setting a target temperature ($T_f$) and selecting either a target-condition control mode or a present-condition control mode, and supplying an undiluted fuel to a fuel mixer in an undiluted fuel feed amount or speed determined according to the selected mode, and then supplying thus made diluted fuel in the fuel mixer to a stack of the fuel cell to start an operation of the fuel cell (S3);
   fixing the target-condition control mode so that the undiluted fuel is supplied accordingly if the temperature of the stack reaches a predetermined intermediate temperature ($T_i$) lower than the target temperature ($T_f$), and simultaneously performing a feed-back control to a heat removal rate of a heat exchanger comparing the present temperature of the fuel cell stack with the target temperature so that the temperature of the fuel cell stack is maintained in a normal state where the temperature of the fuel cell stack is within a preset error bound from the target temperature ($T_f$) (S4); and
   increasing or decreasing the undiluted fuel flux or flow rate fixed according to the target-condition control mode in S4, if the fuel cell is in an abnormal state where the temperature (T) of the fuel cell stack deviates from the preset error bound from the target temperature ($T_f$) although the heat exchanger operates in a maximum manner or in a minimum manner, by feed-back control comparing the present temperature of the fuel cell stack with the target temperature so that the temperature of the fuel cell stack comes back to the normal state where the temperature (T) of the fuel cell stack is within a preset error bound from the target temperature ($T_f$).

2. The method according to claim 1, wherein in the step S1, the fuel consumption rate or speed of Step S1 is determined as the sum of a fuel consumption rate or speed required for generating a current at the fuel cell and an inevitable fuel loss rate or speed when the fuel cell is in operation.

3. The method according to claim 2, wherein the fuel consumption rate or speed required for generating a current is determined by a measured current value according to the operation of the fuel cell and a Faraday constant.

4. The method according to claim 2, wherein the inevitable fuel loss rate is determined as the sum of fuel losses caused by crossover of a fuel passing from anode to cathode of the fuel cell and a fuel loss caused by evaporation at a gas-liquid separator and/or a fuel mixer.

5. The method according to claim 1, wherein in the step S3, if temperature (T) of the fuel cell stack is lower than the intermediate temperature ($T_i$), an output power of the heat exchanger is set to be 0 (zero), and in the step S4, if temperature (T) of the fuel cell stack is equal to or higher than the intermediate temperature ($T_i$), the heat exchanger starts to perform heat exchange.

6. The method according to claim 1, wherein in the step S4, the intermediate temperature ($T_i$) is lower than the target temperature ($T_f$), by 5 to 30° C.

7. The method according to claim 1, wherein when the fuel cell is being operated, the method further comprises determining whether to stop an operation of the fuel cell based on an output voltage of the fuel cell stack and/or a temperature of the fuel cell stack, and the operation of fuel cell is stopped if the output voltage is lower than a minimum output voltage ($V_{min}$) or the temperature of the fuel cell stack exceeds an upper limit.

8. The method according to claim 7, wherein the minimum output voltage ($V_{min}$) is 0.1~0.2V, and the upper limit of temperature is 80 to 100° C.

9. The method according to claim 1, wherein in the step S3 and S4, the feed-back control manner is respectively one or combination of P, PI or PID.

10. The method according to claim 1, wherein, in a startup stage, controlling an output current is further performed, and
   in a region where an output current density (I) is lower than a final output current density ($I_{st}$), the output current density is increased by each increment ($\Delta I$) of 5 to 100 mA/cm$^2$, if an elapsed time (t) reaches a holding time ($t_h$), and
   in each increasing stage, if the voltage change rate (dV/dt) reaches the first voltage change rate (P1) while the current is constantly maintained, then the output current density is not increased until the corresponding voltage change rate (dV/dt) reaches the second voltage change rate (dV/dt) (P2), wherein P2 is smaller than P1, and after reaching the second voltage change rate (dV/dt) (P2), the output current density is increased by the increment ($\Delta I$) even before the elapsed time (t) reaches the holding time ($t_h$), and
   the above process is repeated to reach the final target output current density.

11. An apparatus for simultaneously controlling a fuel concentration and a temperature of liquid fuel cell by using a temperature-control based feed-back control without using a concentration sensor, comprising a microprocessor, the microprocessor being programmed to perform:
determining a fuel consumption rate or consumption speed in a given operating condition based on a database of fuel consumption rates or consumption speeds of the liquid fuel cell, which database is determined according to operating condition, and determining an undiluted fuel flux or flow rate corresponding to the fuel consumption rate or consumption speed;
selecting any one of the target-condition control mode and the present-condition control mode and starts an operation of fuel cell by supplying an undiluted fuel at a flux or flow rate determined accordingly;
fixing the target-condition control mode so that the undiluted fuel is supplied accordingly if the temperature of the fuel cell stack reaches a predetermined intermediate temperature ($T_i$) lower than the target temperature ($T_f$), and performing a feed-back control to a heat removal rate of the heat exchanger comparing the present temperature of the fuel cell stack with the target temperature so that the temperature of the fuel cell stack is maintained in a normal state where the temperature of the fuel cell stack is within a preset error bound from the target temperature ($T_f$); and
increasing or decreasing the undiluted fuel flux or flow rate fixed according to the target-condition control mode, if the temperature of the fuel cell stack deviates from the preset error bound from the target temperature, by feed-back control comparing the present temperature of the fuel cell stack with the target temperature so that the temperature of the fuel cell stack comes back to a normal state where the temperature of the fuel cell stack is within a preset error bound from the target temperature ($T_f$).

12. The apparatus according to claim 11, wherein the microprocessor comprises:
a storage unit in which a database is built with fuel consumption rates or consumption speeds of the liquid fuel cell determined according to operating conditions of the fuel cell;
a first processing unit which is programmed for calling the database of the fuel consumption rates or speeds from the first processing unit, calculating a fuel consumption rate or consumption speed based on the database, and sending a signal of an undiluted fuel feed amount or feed speed to an undiluted fuel supply unit; and
a second processing unit which is programmed for receiving a signal of a present temperature from a temperature measuring device of the fuel cell stack, comparing the present temperature of the fuel cell stack with the target temperature to calculate an error value, calculating a control output quantity based on the error value by means of P, PI or PID manner, and sending the corresponding control output quantity to the undiluted fuel supply unit and/or a heat exchange rate control unit of the heat exchanger.

13. The apparatus according to claim 12, wherein the second processing unit comprises:
a third processing unit which is programmed for receiving the signal of the present temperature from the temperature measuring device of the fuel cell stack, comparing the present temperature of the fuel cell stack with the target temperature to calculate the error value, calculating the control output quantity based on the error value by means of P, PI or PID manner, and sending the corresponding control output quantity to the undiluted fuel supply unit; and
a fourth processing unit which is programmed for receiving the signal of the present temperature from the temperature measuring device of the fuel cell stack, comparing the present temperature of the fuel cell stack with the target temperature to calculate the error value, calculating the control output quantity based on the error value by means of P, PI or PID manner, and sending the corresponding control output quantity to the heat exchange rate control unit of the heat exchanger.

14. The apparatus according to claim 11, wherein the microprocessor is programmed to further performing: determining whether to stop an operation of the fuel cell based on an output voltage of the fuel cell stack and/or a temperature of the fuel cell stack, and the operation of fuel cell is stopped if the output voltage is lower than a minimum output voltage ($V_{min}$) or the temperature of the fuel cell stack exceeds an upper limit.

15. The apparatus according to claim 11, wherein the microprocessor is programmed to further performing: controlling an output current in a startup stage, and
wherein in a region where an output current density (I) is lower than a final output current density ($I_{st}$), the output current density is increased by each increment ($\Delta I$) of 5 to 100 mA/cm$^2$, if an elapsed time (t) reaches a holding time ($t_h$), and
in each increasing stage, if the voltage change rate (dV/dt) reaches the first voltage change rate (P1) while the current is constantly maintained, then the output current density is not increased until the corresponding voltage change rate (dV/dt) reaches the second voltage change rate (dV/dt) (P2), wherein P2 is smaller than P1, and after reaching the second voltage change rate (dV/dt) (P2), the output current density is increased by the increment ($\Delta I$) even before the elapsed time (t) reaches the holding time ($t_h$), and
the above process is repeated to reach the final target output current density.

16. The apparatus according to claim 11, wherein the data storage unit is connected to a device measuring one or more selected from the group consisting of output voltage, output current of the fuel cell stack, stack temperature and ambient pressure.

17. A liquid fuel cell apparatus, comprising:
a fuel cell stack;
a heat exchange unit connected to the fuel cell stack;
a fuel supply unit supplying a diluted fuel to the fuel cell stack;
a device for measuring the fuel cell stack temperature; and
a device for measuring at least one of output voltage and output current of the fuel cell stack, and a control device according to claim 11.

18. The apparatus according to claim 17, wherein the fuel supply unit comprises a fuel mixer supplying a diluted fuel to the fuel cell stack and an undiluted fuel supply pump supplying an undiluted fuel to the fuel mixer, and the control device is connected to the undiluted fuel supply pump, and
the heat exchange unit comprises an anode side heat exchanger connected to an anode and a cathode side heat exchanger connected to a cathode, and a blowing fan which is connected to the heat exchange unit, and the control device is connected to the blowing fan.

19. The apparatus according to claim 17, wherein the liquid fuel employed by the liquid fuel cell is at least one of reactants of methanol, ethanol, formic acid, isopropanol, propanol, ethylene glycol, dimethyl ether, butanol, hydrogen, butane, ethane, propane, carbon dioxide, water, bio fuel, and their mixtures.

* * * * *